US009690957B2

(12) United States Patent
Sadr et al.

(10) Patent No.: US 9,690,957 B2
(45) Date of Patent: *Jun. 27, 2017

(54) RFID SYSTEMS USING DISTRIBUTED EXCITER NETWORK

(71) Applicant: Mojix, Inc., Los Angeles, CA (US)

(72) Inventors: Ramin Sadr, Los Angeles, CA (US);
John Gevargiz, Los Angeles, CA (US);
Robert Lee, Los Angeles, CA (US);
Majid Manteghi, Blackburg, VA (US);
Gordon Oliver, Los Angeles, CA (US);
Michael Collender, Los Angeles, CA (US); Christopher Jones, Pacific Palisades, CA (US); Syed Hassan Yousaf, Los Angeles, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,851

(22) Filed: Mar. 14, 2014

(65) Prior Publication Data

US 2014/0292494 A1    Oct. 2, 2014

Related U.S. Application Data

(63) Continuation of application No. 13/757,688, filed on Feb. 1, 2013, now Pat. No. 8,680,970, which is a
(Continued)

(51) Int. Cl.
*H04Q 5/22* (2006.01)
*G06K 7/10* (2006.01)
(Continued)

(52) U.S. Cl.
CPC .......... *G06K 7/10158* (2013.01); *G06K 7/01* (2013.01); *G06K 7/10188* (2013.01); *G06K 7/10475* (2013.01); *G06Q 10/087* (2013.01)

(58) Field of Classification Search
CPC ...... H01Q 1/125; H01Q 3/30; G06K 7/10475; G06K 7/01
(Continued)

(56) References Cited

U.S. PATENT DOCUMENTS 5,525,991 A    6/1996 Nagura et al.
5,640,151 A    6/1997 Reis et al.
(Continued)

FOREIGN PATENT DOCUMENTS

JP    1999066250 A    3/1999
JP    2001148652 A    5/2001
(Continued)

OTHER PUBLICATIONS

International Search Report for International Application PCT/US08/58061, Report completed Jun. 9, 2008, Report mailed Jun. 30, 2008, 3 pages.
(Continued)

*Primary Examiner* — Vernal Brown
(74) *Attorney, Agent, or Firm* — KPPB LLP

(57) ABSTRACT

RFID systems are disclosed that include at least one RFID receiver system and a distributed exciter architecture. Exciters can be connected via wired and/or wireless connections to the RFID receiver system, which can control activation of the exciters to detect the presence of RFID tags within interrogation spaces defined by the exciter topology. One embodiment includes an RFID receiver system configured to detect information from RFID tags within a receive coverage area, and a plurality of exciters defining a plurality of interrogation spaces within the receive coverage area of the receiver system. The receiver system is configured to transmit a control signal that identifies one of the exciters and includes information indicative of an RFID tag interrogation signal, the exciters are configured to receive the control
(Continued)

signal, and the exciter identified in the control signal is configured to illuminate an interrogation space with the RFID tag interrogation signal.

28 Claims, 23 Drawing Sheets

Related U.S. Application Data continuation of application No. 12/054,331, filed on Mar. 24, 2008, now Pat. No. 8,395,482.

(60) Provisional application No. 60/896,864, filed on Mar. 23, 2007.

(51) Int. Cl.
*G06Q 10/08* (2012.01)
*G06K 7/01* (2006.01)

(58) Field of Classification Search
USPC .............................. 340/10.34, 572.1, 12.22
See application file for complete search history.

(56) References Cited

U.S. PATENT DOCUMENTS

| | | | |
|---|---|---|---|
| 5,929,701 A * | 7/1999 | Rice | H03F 1/3235 |
| | | | 330/151 |
| 5,936,527 A | 8/1999 | Isaacman et al. | |
| 5,955,966 A | 9/1999 | Jeffryes et al. | |
| 6,392,544 B1 | 5/2002 | Collins et al. | |
| 6,456,239 B1 | 9/2002 | Werb et al. | |
| 6,678,340 B1 | 1/2004 | Khlat et al. | |
| 6,750,757 B1 | 6/2004 | Gabig, Jr. et al. | |
| 6,917,291 B2 | 7/2005 | Allen | |
| 7,026,935 B2 | 4/2006 | Diorio et al. | |
| 7,035,322 B2 | 4/2006 | Girard | |
| 7,155,172 B2 | 12/2006 | Scott | |
| 7,253,717 B2 | 8/2007 | Armstrong et al. | |
| 7,692,532 B2 | 4/2010 | Fischer et al. | |
| 7,789,308 B2 | 9/2010 | Droms et al. | |
| 8,395,482 B2 | 3/2013 | Sadr et al. | |
| 8,552,835 B2 | 10/2013 | Sadr | |
| 8,570,172 B2 * | 10/2013 | Al-Mahdawi | 340/572.1 |
| 8,830,091 B2 | 9/2014 | Karlsson et al. | |
| 9,014,970 B2 | 4/2015 | Oi et al. | |
| 2002/0063622 A1 | 5/2002 | Armstrong et al. | |
| 2002/0113736 A1 | 8/2002 | Toutain et al. | |
| 2002/0159540 A1 | 10/2002 | Chiodini | |
| 2004/0042539 A1 | 3/2004 | Vishakhadatta et al. | |
| 2004/0201539 A1 | 10/2004 | Yewen | |
| 2005/0231367 A1 * | 10/2005 | Bellantoni | 340/572.1 |
| 2005/0280508 A1 | 12/2005 | Mravca et al. | |
| 2006/0019679 A1 | 1/2006 | Rappaport et al. | |
| 2006/0022800 A1 | 2/2006 | Krishna et al. | |
| 2006/0065731 A1 | 3/2006 | Powell et al. | |
| 2006/0103576 A1 | 5/2006 | Mahmoud et al. | |
| 2006/0170565 A1 | 8/2006 | Husak et al. | |
| 2007/0046467 A1 * | 3/2007 | Chakraborty | G06K 7/0008 |
| | | | 340/572.1 |
| 2007/0219720 A1 | 9/2007 | Trepagnier et al. | |
| 2010/0164805 A1 * | 7/2010 | Niu et al. | 342/377 |
| 2011/0153208 A1 | 6/2011 | Kruglick | |
| 2012/0121161 A1 | 5/2012 | Eade et al. | |
| 2013/0141220 A1 | 6/2013 | Sadr | |
| 2016/0316325 A1 | 10/2016 | Sadr et al. | |

FOREIGN PATENT DOCUMENTS

| | | |
|---|---|---|
| JP | 2004094752 A | 3/2004 |
| JP | 2004194150 A | 7/2004 |
| JP | 2006293634 A | 10/2006 |
| JP | 2006318396 A | 11/2006 |
| JP | 2006324880 A | 11/2006 |
| WO | 2006011208 A1 | 2/2006 |
| WO | 2006075367 A1 | 7/2006 |

OTHER PUBLICATIONS

Written Opinion of the International Searching Authority for International Application PCT/US08/58061, Opinion completed Jun. 9, 2008, Opinion mailed Jun. 30, 2008, 6 pages.

Extended European Search Report for European Application EP08732774.8, Report completed Jul. 15, 2015, Mailed Jul. 23, 2015, 5 Pgs.

"Simultaneous Localization and Mapping (SLAM)", Retrieved from https://www.usna.edu/Users/cs/taylor/courses/si475/class/slam.pdf on Nov. 10, 2014, 3 pgs.

Beevers, Kristopher R. et al., "Fixed-lag Sampling Strategies for Particle Filtering SLAM", 2007 IEEE International Conference on Robotics and Automation, Apr. 10-14, 2007, 6 pgs.

Eade, Ethan et al., "Monocular Graph SLAM with Complexity Reduction", 2010 IEEE/RSJ International Conference on Intelligent Robots and Systems Oct. 18-22, 2010, Taipei, Taiwan, pp. 3017-3024.

Howard, Andrew, "Multi-robot Simultaneous Localization and Mapping using Particle Filters", International Journal of Robotics Research, vol. 25 Issue 12, Dec. 2006, 8 pages.

Huang, Joseph et al., "Efficient, Generalized Indoor WiFi GraphSLAM", IEEE International Conference on Robotics and Automation, Sep. 13, 2010, 6 pgs.

Montemerlo, Michael et al. "FastSLAM: A Factored Solution to the Simultaneous Localization and Mapping Problem", In Proceedings of the AAAI National Conference on Artificial Intelligence, 2002, 6 pgs.

Slivka, Eric "Apple Appears to Have Acquired GPS Firm Coherent Navigation [Confirmed]", May 17, 2015, retrieved from http://www.macrumors.com/2015/05/17/apple-coherent-navigation-acquisition/ on May 18, 2015, 16 pgs.

Thrun, Sebastian et al., "Multi-Robot SLAM with Sparse Extended Information Filters", Department of Computer Science, Stanford University, Stanford, CA 2 Department of Physics, Carnegie Mellon University, Pittsburgh, PA, Jul. 29, 2014, 12 pages.

* cited by examiner 17-4 Time Line

| | 1 | 2 | 3 | 4 | 5 | 6 | 7 |
|---|---|---|---|---|---|---|---|
| 1 | | | 13 | | | | |
| 2 | | | | 6 | 1 | 1 | |
| 3 | | 10 | 2 | | | | 6 |
| 4 | | | | 7,11,16 | | | |
| 5 | | | | | 6 | | 4 |
| 6 | | | | | | | 7 |
| 7 | 12 | | | | 2 | | |
| 8 | | 4 | | | 7 | | 15 |
| 9 | | | 5 | | | | |
| 10 | | | | | 3 | 5 | |
| 11 | | | | 9 | | | |
| 12 | | 16 | 3,7 | | | | 11 |
| 13 | | | | | 9 | 16 | |
| 14 | | | | 4,5 | 16 | 7 | |
| 15 | | 3 | | 3 | 4 | 3,12 | |
| 16 | 15 | 7 | | | | 14 | |
| 17 | | 6,13 | | | | 6 | 12,13 |
| 18 | | | | | | | 8 |
| 19 | | | | | | | |
| 20 | | 9 | | | | | 5 |
| 21 | 17-8 | | | 12 | 11 | | |
| 22 | | | | 10 | | | |
| 23 | 7,11 | | | | | 15 | |
| 24 | | | | | | | 9 |
| 25 | 10 | 11 | 9 | | 15 | | |
| 26 | | | | 14 | | | |
| 27 | | | 15 | | | | |
| 28 | | | 11 | | | | |
| 29 | | | | | | 11 | |
| 30 | | | 8 | 8 | | | |
| 31 | | | | | | | |
| 32 | | 1 | | | | | |
| 33 | | 2 | | 13 | | | |
| 34 | 3,9 | | | | | 2,10 | 2,14 |
| 35 | | | | | 13 | | |
| 36 | | | | | 8 | 8 | 3 |
| 37 | | | 10 | | | | |
| 38 | | | | | | 9 | |
| 39 | | 5 | | | | | |
| 40 | 4 | | | | | | |
| 41 | | 8 | | | 12 | | |
| 42 | | 12,15 | | | | | |
| 43 | | | | | | | |
| 44 | 2 | | 14 | 1 | 14 | 13 | |
| 45 | | | | | | | 10 |
| 46 | 1 | | | | | | 16 |
| 47 | | | 1,6,12 | | | | |
| 48 | | | 4 | | | | |
| 49 | 6,14,16 | 14 | | 2 | 5 | | 1 |
| 50 | 8 | | | | | | |
| 51 | 13 | | 16 | | 10 | | |
| 52 | 5 | | | | | 4 | |

17-2 Exciters IDs

Frequency Channel 17-10 Frequency Channels

FIG. 17b

RFID SYSTEMS USING DISTRIBUTED EXCITER NETWORK

RELATED APPLICATIONS

This application is a continuation application of U.S. patent application Ser. No. 13/757,688 filed Feb. 1, 2013, which is a continuation of U.S. patent application Ser. No. 12/054,331 filed Mar. 24, 2008, which claimed priority to U.S. Provisional Patent Application No. 60/896,864 filed Mar. 23, 2007, the disclosure of which is incorporated herein by reference.

BACKGROUND OF THE INVENTION

This invention relates generally to RFID systems and more specifically to an RFID system that incorporates at least one RFID receiver system and a distributed exciter architecture that defines a plurality of interrogation spaces.

The detection of signals in difficult environments, such as where the signal to noise ratio is very low and/or the interference from other signals is very high, has always been a challenging problem.

In RFID systems such as the RFID systems described in U.S. patent application Ser. No. 11/971,678, entitled "RFID System with Low Complexity Implementation and Pallet Coding Error Correction," filed Jan. 9, 2008, the disclosure of which is incorporated by reference herein in its entirety, RFID receiver subsystems rely on an enhanced RF front end as well as processing capabilities, for detecting very low power signals in the presence of additive white Gaussian noise with further channel distortions in in-door or out-door wireless propagation channels. These techniques are particularly applicable to Radio Frequency Identification (RFID) based systems. FIG. 12 illustrates a transmit and receive RFID reader similar to the transmit and receive readers described in U.S. patent application Ser. No. 11/971,678 and the specifics of the RF front end. The reader (12-9) follows an RFID tag protocol to communicate with tags (12-5) using the same transmit and receive frequencies. The time-line showing this communication is shown in FIG. 13. The protocol governs the reader transmission of (12-4) data (13-2) and a continuous waveform (CW) (13-4) to the tag, and reception (12-2) of the tag's data (13-10). From FIG. 13, during the period that the tag is backscattering a packet to the reader, the reader is transmitting CW signal (13-4). That is the received signal is a composite of transmitted CW and received tag signal (12-7). The receiver subsystem (12-9) performs baseband down conversion (12-12, 12-14), filtering (12-16, 12-18), and amplification (12-20, 12-22). At the output of the baseband amplifiers the signal from the tag is present, as well as a strong DC component. This DC component is canceled by using DC block capacitors (12-27, 12-29). To further improve the performance of the DC cancellation, the input to the DC block capacitors (12-27, 12-29) is controlled through a switch (12-24, 12-26) which is only closed during the period that the system is receiving data from the tag, as depicted in FIG. 13 (13-10). The digital processor (12-46), which maintains the system timing control of the switch control, opens the switch during the reader transmit periods (13-2, 13-6, 13-14, 13-18), and closes the switches during the expected receive periods (13-4, 13-10, 13-16). The output of the DC cancellation capacitors is followed by the AGC loops (12-32, 12-34), analog to digital converters (12-36, 12-38), and digital processor (12-40), which includes the control algorithms.

SUMMARY OF THE INVENTION

RFID systems in accordance with many embodiment of the invention include one or more RFID receiver systems that are associated with a number of distributed transmitters, referred to as RFID tag exciters (or just "exciter"). The exciters can act as signal repeaters from the RFID receiver system that enable transmission of a tag signal to a distant exciter, which in turn filters, amplifies and re-transmits the signal to the intended collection of RFD tags within the line-of-sight view of the exciter. The logical interconnect and communications topology scales from a centralized point of control up to a fully connected graph. Physically, the communications network can be either wired lines or wireless.

Each exciter may or may not embed active re-generation of the transmitted signal to the RFID tag; however, in many embodiments each exciter emits sufficient power and a waveform compatible with the requirements of a standard such as set forth by Electronic Product Code Global (EPC Global) or International Standard Organizations (ISO). The transmission from the RFID receiver system to an exciter may be compatible with these standards and/or utilize other waveforms compatible with regulatory requirements such as set forth by US Federal Communication Commission (FCC) or other international regulatory agencies.

One embodiment of the invention includes an RFID receiver system configured to detect information from RFID tags within a receive coverage area, and a plurality of exciters defining a plurality of interrogation spaces within the receive coverage area of the RFID receiver system. In addition, the RFID receiver system is configured to transmit a control signal that identifies one of the plurality of exciters and includes information indicative of an RFID tag interrogation signal, the plurality of exciters are configured to receive the control signal, and the exciter identified in the control signal is configured to illuminate an interrogation space with the RFID tag interrogation signal.

In a further embodiment of the invention, the RFID receiver system communicates to at least one of the plurality of exciters via a wired connection.

In another embodiment of the invention, the wired connection directly connects the exciter to the RFID receiver system.

In a still further embodiment of the invention, the wired connection connects the exciter to another of the plurality of exciters, which is configured to relay control signals from the RFID receiver system via the wired connection.

In still another embodiment of the invention, the wired connection is a coaxial cable, and the control signal is modulated at a first RF frequency.

In a yet further embodiment of the invention, the exciter is configured to down convert the control signal to extract at least the identity of the exciter identified by the control signal, and the exciter is configured to up convert and transmit the RFID tag interrogation signal at a second RF frequency, when the exciter is the exciter identified by the control signal.

In yet another embodiment of the invention, the control signal specifies the frequency of the second RF frequency.

In a further embodiment of the invention again, the second RF frequency is the same as the first RF frequency.

In another embodiment of the invention again, the wired connection is a twisted pair cable, and the control signal is a baseband signal.

In a further additional embodiment of the invention, the exciter is configured to extract at least the identity of the exciter identified by the control signal, and the exciter is configured to up convert and transmit the RFID tag interrogation signal at a transmit RF frequency, when the exciter is the exciter identified by the control signal.

In another additional embodiment of the invention, the control signal specifies the transmit RF frequency.

In a still yet further embodiment of the invention, the RFID receiver system communicates with at least one of the plurality of exciters via a wireless connection.

In still yet another embodiment of the invention, the wireless connection is a direct connection between the RFID receiver system and the exciter.

In a still further embodiment of the invention again, the wireless connection is between the exciter and a second of the plurality of exciters.

In still another embodiment of the invention again, the second of the plurality of exciters is configured to relay control signals from the RFID receiver system via the wireless connection.

In a still further additional embodiment of the invention, the control signal is modulated at a first RF frequency, and the exciter is configured to down convert the control signal to extract at least the identity of the exciter identified by the control signal.

In still another additional embodiment of the invention, the exciter is configured to up convert and transmit the RFID tag interrogation signal at a second RF frequency when the exciter is the exciter identified by the control signal.

In a yet further embodiment of the invention again, the control signal specifies the frequency of the second RF frequency.

In yet another embodiment of the invention again, the exciter is configured to generate an RFID tag interrogation signal and modulate the RFID tag interrogation signal onto a second RF frequency.

In a yet further additional embodiment of the invention, the control signal specifies the frequency of the second RF frequency.

In yet another additional embodiment of the invention, the RFID receiver system is configured to transmit a status signal at a first RF frequency that identifies one of the plurality of exciters, the exciter is configured to extract at least the identity of the exciter identified by the status signal, and the exciter is configured to generate a response signal and transmits the response signal at a second RF frequency.

In a further additional embodiment of the invention again, the waveform of the response signal is similar to the waveform generated by an illuminated RFID tag.

In another additional embodiment of the invention again, the status signal specifies the frequency of the second RF frequency.

In another further embodiment of the invention, the RFID receiver system is configured to transmit control signals that activate a plurality of the exciters to transmit RFID tag interrogation signals at different frequencies.

In still another further embodiment of the invention, the control signals transmitted by the RFID receiver system cause the plurality of activated exciters to transmit in accordance with a frequency hopping protocol.

In yet another further embodiment of the invention, the RFID receiver system is configured to allocate frequencies to exciters randomly.

In another further additional embodiment of the invention, the RFID receiver system possesses information concerning the exciter distribution topology, and the RFID receiver system uses the topology information when allocating frequencies to activated exciters.

In another further embodiment of the invention again, the control signal includes an n-bit address.

In still yet another further embodiment of the invention, the control signal includes all the necessary signal characteristics and parameters to generate the desired waveform output from the exciter.

In still another further additional embodiment of the invention, the control signal includes information that can be used by an exciter to perform transmit power calibration.

In still another further embodiment of the invention again, the control signal includes information indicative of a transmission frequency selection.

Yet another further additional embodiment of the invention also includes a second RFID receiver system configured to detect information from RFID tags within a second receive coverage area, and a plurality of exciters defining a plurality of interrogation spaces within the receive coverage area of the second RFID receiver system. In addition, the second RFID receiver system is configured to transmit a control signal that identifies one of the plurality of exciters and includes information indicative of an RFID tag interrogation signal, the plurality of exciters within the coverage area of the second RFID receiver system are configured to receive the control signal from the second RFID receiver system, and the exciter identified in the control signal is configured to illuminate an interrogation space within the coverage area of the second RFID receiver system with the RFID tag interrogation signal.

In yet another further embodiment of the invention again, the RFID receiver system is configured to detect RFID tag information when an exciter illuminates an interrogation space with an RFID tag interrogation signal, and the RFID receiver system is configured to determine whether the detected information is from an RFID tag located within the interrogation space illuminated by the exciter.

Another further additional embodiment of the invention again includes a sensor located within the illuminated interrogation space configured to detect changes within the interrogation space. In addition, the sensor is configured to communicate sensor output to the RFID receiver system, and the RFID receiver system is configured to determine whether the detected information is from an RFID tag located within the interrogation space illuminated by the exciter using information including the sensor output.

In still yet another further additional embodiment of the invention, the RFID receiver system is configured to detect RFID tag information when other exciters illuminate other interrogation spaces with RFID tag interrogation signals, and the RFID receiver system is configured to determine whether the detected information is from an RFID tag located within the interrogation space illuminated by the exciter using information including the RFID tag information detected when other exciters illuminated other interrogation spaces.

In still yet another further embodiment of the invention again, the RFID tag information is an RF signal, the RFID receiver system is configured to collect information concerning features of the RFID tag information RF signal, and the RFID receiver system is configured to determine whether the detected information is from an RFID tag located within the interrogation space illuminated by the exciter using information including the features of the RFID tag information RF signal.

In yet another further additional embodiment of the invention again, the collected features of the RFID tag information RF signal include signal strength, signal-to-noise ratio, and direction of arrival.

In a still yet further additional embodiment of the invention, the RFID receiver system repeatedly causes a plurality of exciters to sequentially illuminate a plurality of interrogation spaces and records the detection of RFID tag information, and the RFID receiver system is configured to determine whether detected information is from an RFID tag located within an interrogation space illuminated by one of the plurality of exciters using information including the rate at which the RFID tag information is detected when the interrogation space is illuminated.

In still yet another additional embodiment of the invention, the RFID receiver system possesses information concerning the exciter topography, the RFID receiver system is configured to estimate expected detection rates for RFID tags in different interrogation spaces, and the RFID receiver system is configured to determine whether detected information is from an RFID tag located within an interrogation space illuminated by one of the plurality of exciters using information including the rate at which the RFID tag information is detected when the interrogation space is illuminated and the expected detection rates for RFID tags in different interrogation spaces.

In a yet further additional embodiment of the invention again, the RFID receiver system is configured to determine movement of an RFID tag from one interrogation space to another interrogation space using information including the rate at which the information is detected when interrogation spaces are illuminated and the expected detection rates for RFID tags in different interrogation spaces.

An exciter configured to illuminate an interrogation space in accordance with an embodiment of the invention includes, an input configured to receive a control signal including an exciter address and information indicative of an RFID tag interrogation signal, and a transmitter configured to transmit an RFID tag interrogation signal, a decode module configured to control the transmitter to transmit the RFID tag interrogation signal indicated by a control signal, when the exciter is addressed by the exciter address in the control signal.

In a further embodiment of the invention, the input includes a coaxial cable connector, the control signal is modulated on a first RF frequency, and the transmitter is configured to modulate the RFID tag interrogation signal onto a second RF frequency.

In another embodiment of the invention, the frequency of the second RF frequency is specified by the control signal.

In a still further embodiment of the invention, the frequency of the second RF frequency is the same as the frequency of the first RF frequency.

Still another embodiment of the invention also includes an output, where the output includes a coaxial cable connector, and a coupler connected to the input, the decode module, and the output, where the coupler is configured to split the input signal between the decode module and the output.

In a yet further embodiment of the invention, the input includes a twisted pair connector, the control signal is a baseband signal, and the transmitter is configured to modulate the RFID tag interrogation signal onto an RF frequency.

In yet another embodiment of the invention, the frequency of the RF frequency is specified by the control signal.

A further additional embodiment of the invention includes an output, where the output includes a twisted pair connector, and a coupler connected to the input, the decode module, and the output, where the coupler is configured to split the input signal between the decode module and the output.

In another additional embodiment of the invention, the input is connected to a receive antenna, the control signal is a wireless signal transmitted at a first RF frequency, and the transmitter is configured to modulate the RFID tag interrogation signal onto a second RF frequency.

In a further embodiment of the invention again, the frequency of the second RF frequency is specified by the control signal.

In another embodiment of the invention again, the decode module is configured to control the transmitter to retransmit the control signal, when the exciter is not addressed by the exciter address in the control signal.

In a still yet further embodiment of the invention, the transmitter includes a power amplifier, and a level control loop configured to monitor the output of the power amplifier to adjust the gain of the power amplifier to maintain the output signal below a predetermined threshold.

In still yet another embodiment of the invention the transmitter includes a power amplifier, and a level control loop configured to detect the power of input signals to the power amplifier and the output of the power amplifier and to adjust the gain of the power amplifier to maintain the output signal below a predetermined threshold.

An embodiment of the method of the invention includes generating a control signal including an exciter address and an RFID tag interrogation signal, transmitting the control signal to at least one of the plurality of distributed exciters, illuminating an interrogation space with the RFID tag interrogation signal using the exciter addressed by the control signal, and receiving an RFID tag information signal.

In a further embodiment of the method of the invention, generating a control signal includes identifying an n-bit address associated with an exciter located within an interrogation space.

In another embodiment of the method of the invention, generating a control signal includes determining signal characteristics and parameters of an RFID tag interrogation signal to be generated by an exciter.

In a still further embodiment of the method of the invention, generating a control signal includes generating information that can be used by an exciter to perform transmit power calibration.

In still another embodiment of the method of the invention, generating a control signal includes generating information indicative of a transmission frequency selection.

In a yet further embodiment of the method of the invention, transmitting the control signal includes transmitting the control signal to a first exciter that relays the signal to a second exciter.

In yet another embodiment of the method of the invention, illuminating the interrogation space includes extracting the RFID tag interrogation signal from the control signal, modulating the RFID tag interrogation signal onto a transmission frequency, and transmitting the modulated RFID tag interrogation signal.

In a further additional embodiment of the method of the invention, extracting the RFID tag interrogation signal further comprises down converting the control signal.

In another additional embodiment of the method of the invention, modulating the RFID tag interrogation signal onto a transmission frequency further comprises modulating the RFID tag interrogation signal onto a transmission frequency specified by the control signal.

In a further embodiment again of the method of the invention, receiving an RFID tag information signal includes determining whether received RFID tag information is from an RFID tag located within the illuminated interrogation space.

In another embodiment again of the method of the invention, determining whether received RFID tag information is from an RFID tag located within the illuminated interrogation space includes detecting changes in the interrogation space using at least one sensor.

In a still yet further embodiment of the method of the invention, determining whether received RFID tag information is from an RFID tag located within the illuminated interrogation space includes detecting RFID tag information when other interrogation spaces are illuminated.

In still yet another embodiment of the method of the invention, determining whether received RFID tag information is from an RFID tag located within the illuminated interrogation space includes collecting information concerning features of the RFID tag information signal.

In a still further additional embodiment of the method of the invention, the collected information concerning features of the RFID tag information includes signal strength, signal-to-noise ratio, and direction of arrival.

In still another additional embodiment of the method of the invention, determining whether received RFID tag information is from an RFID tag located within the illuminated interrogation space includes repeatedly illuminating a plurality of interrogation spaces, recording the detection of RFID tag information, and determining the rate at which RFID tag information is detected when each interrogation space is illuminated.

In a still further embodiment again of the method of the invention, determining whether received RFID tag information is from an RFID tag located within the illuminated interrogation space includes estimating expected detection rates for RFID tags in different interrogation spaces using information concerning the exciter topography, and comparing the rate at which RFID tag information is detected when an interrogation space is illuminated with expected detection rates for the interrogation space when an RFID tag is located within different interrogation spaces.

A method of estimating the location of an RFID tag within a plurality of interrogation spaces in accordance with an embodiment of the method of the invention includes repeatedly illuminating each of the plurality of interrogation spaces, recording the illuminated interrogation space when the RFID tag is detected, and determining the rate at which the RFID tag is detected when each interrogation space is illuminated, and recording the rate at which the RFID tag is detected for each interrogation space and for each exciter.

A yet further additional embodiment of the method of the invention includes obtaining information concerning the topology of the plurality of interrogation spaces, estimating expected detection rates for RFID tags in different interrogation spaces using information concerning the interrogation space topography, and comparing the rate at which RFID tag information is detected when an interrogation space is illuminated with expected detection rates for the interrogation space when an RFID tag is located within different interrogation spaces.

In yet another additional embodiment of the method of the invention, comparing the observed detection rate to the estimated detection rate comprises using the difference between the expected detection rate and observed detection rate as the argument to a Gaussian density function to produce a probability of the observed detection rate in a given interrogation space.

In a yet further embodiment again of the method of the invention, recording the rate at which RFID tag information is detected includes using an exciter ID, a hypothesis region, and an RFID tag ID.

Yet another embodiment again of the method of the invention further includes detecting movement of an RFID tag from a first interrogation space to a second interrogation space using the comparison of the rate at which RFID tag information is detected and the expected detection rates.

BRIEF DESCRIPTION OF THE DRAWINGS

FIGS. 17a and 17b are conceptual diagrams illustrating frequency assignment and scheduling for a plurality of exciters in accordance with an embodiment of the invention.

DETAILED DESCRIPTION OF A PREFERRED EMBODIMENT

Figure 1:
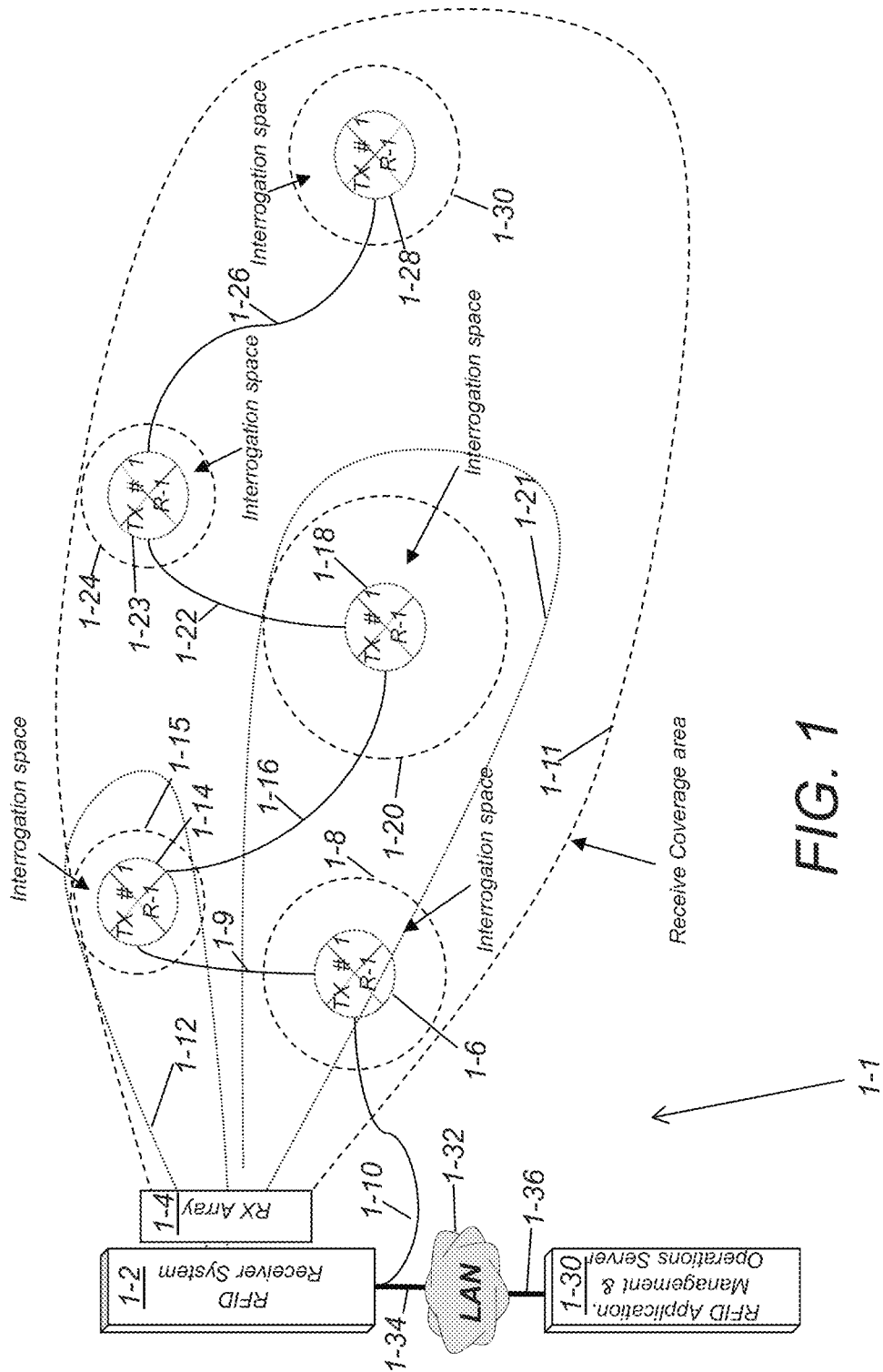
FIG. 1 is a network diagram of an RFID system including a distributed exciter architecture, where the exciters are connected to the RFID system via cables, in accordance with an embodiment of the invention.

Turning now to the drawings, RFID systems including at least one RFID receiver system and a distributed exciter architecture are shown. In several embodiments, the desired overall interrogation space is decomposed into a set of interrogation spaces and exciters are placed in each target interrogation space. The RFID system obtains information from collections of RFID tags in specific interrogation spaces by controlling the activation of exciters. An RFID tag within an interrogation space is manipulated by illuminating the interrogation space using an RFID tag interrogation signal provided to the exciter by the RFID receiver system. The illuminated RFID tag backscatters information, which can be detected by the RFID receiver system.

The RFID receiver system can control the size of each interrogation space by adjusting the total emitter power from the exciter. In a number of embodiments, the overall performance of the system is improved by selecting each exciter transmit antenna type to provide the desired level of directivity, thereby controlling the beam-width for the target interrogation space. In several embodiments, the exciters are connected via cables to the RFID receiver system. In a number of embodiments, the exciters are wirelessly connected to the RFID receiver system.

When an interrogation space topology has been defined, RFID systems in accordance with embodiments of the invention can control the illumination of individual interrogation spaces to obtain location information concerning items bearing RFID tags. In many embodiments, the RFID system polls exciters. In several embodiment, the RFID system can incorporate additional sensors that detect changes within an interrogation space (e.g. movement) and the RFID system can activate the corresponding exciter and/or exciters associated with adjacent interrogation spaces to obtain information concerning any items bearing RFID tags moving between interrogation spaces.

A problem that can be encountered when using a distributed exciter architecture is the potential for an RFID tag to be read from outside of an exciter's interrogation space (a false read). In several embodiments, information concerning various characteristics of the RFID system are used to detect the occurrence of false reads. In a number of embodiments, data from sensors in the interrogation spaces, RFID tag information detected in other interrogation spaces and/or the RF features of the detected RFID tag information can be used to determine whether a false read has occurred. In many embodiments, statistical analysis is used to detect false reads based upon predicted read rates for RFID tags located within the interrogation space. In these embodiments, repeated illumination of an interrogation space and RFID tag detection rates are compared to predicted detection rates to determine the likely location of the RFID tag. In several embodiments, predicted detection rates are obtained using knowledge of an RFID system's exciter topology.

An RFID system including a distributed exciter architecture in accordance with an embodiment of the invention is shown in FIG. 1. The RFID system (1-1) includes an RFID receiver system (1-2) connected to an array of receiver antennas (1-4) and a plurality of exciters (1-6, 1-14, 1-18, 1-23, 1-28) that are daisy chained to the RFID receiver system via cables (1-10, 1-9, 1-16, 1-22, 1-26). The RFID receiver system (1-2) is also connected to a LAN (1-32) via connection (1-34). An RFID application server (1-30) is connected to the LAN via connection (1-36). Although the plurality of exciters are shown as wired, in many embodiments exciters communicate wirelessly with the RFID receiver system.

In operation, the RFID receiver system (1-2) controls the activation of exciters. The cable segments (1-10, 1-12, 1-16, 1-22, 1-26) carry both direct current (DC) power and control commands from the RFID receiver system (1-2) to each exciter. The transmitted "backhaul signal" from the RFID receiver system (1-2) to the exciters embeds all the necessary signal characteristics and parameters to generate a desired waveform output from the exciter module to an RFID tag. In several embodiments, each exciter can be commanded and addressed by an N-bit address, N-ranging from 16-to-32 bit. The exciters (1-8, 1-14, 1-18, 1-23, 1-28) can be operated sequentially or concurrently, depending on the number of possible beams the RFID receiver system can support. In the illustrated embodiment, the RFID receiver system (1-2) includes a single antenna array (1-4) and is capable of generating a single beam. In other embodiments, the RFID receiver system includes multiple antenna arrays and is capable of generating multiple beams (see discussion below).

The interrogation space and transmitted power of each exciter can be managed and controlled by the RFID receiver system (1-2). In the illustrated embodiment, the RFID receiver system (1-2) controls the exciters to create interrogation space (1-8, 1-15, 1-20, 1-24, & 1-28) of different sizes. In addition, the received coverage area is configurable. The RFID receiver system can receive signals from the complete coverage area (1-11). Alternatively, the RFID receiver system can adaptively beam-form to the specified exciter interrogation spaces (1-12, 1-21).

The RFID application server (1-30) schedules each exciter to operate harmoniously in multiple dimensions, which are time, frequency and space. In a number of embodiments, the RFID application server (1-30) includes a scheduler for S/T/FDM (Space, Time and Frequency Division Multiplexing), which utilizes an optimization algorithm to maximize the probability of successful manipulation of all the RFID tags within a target interrogation space. In addition, the controller may utilize frequency hopping in scheduling the frequency channel for each exciter in order to satisfy various regulatory constraints.

Figure 2:
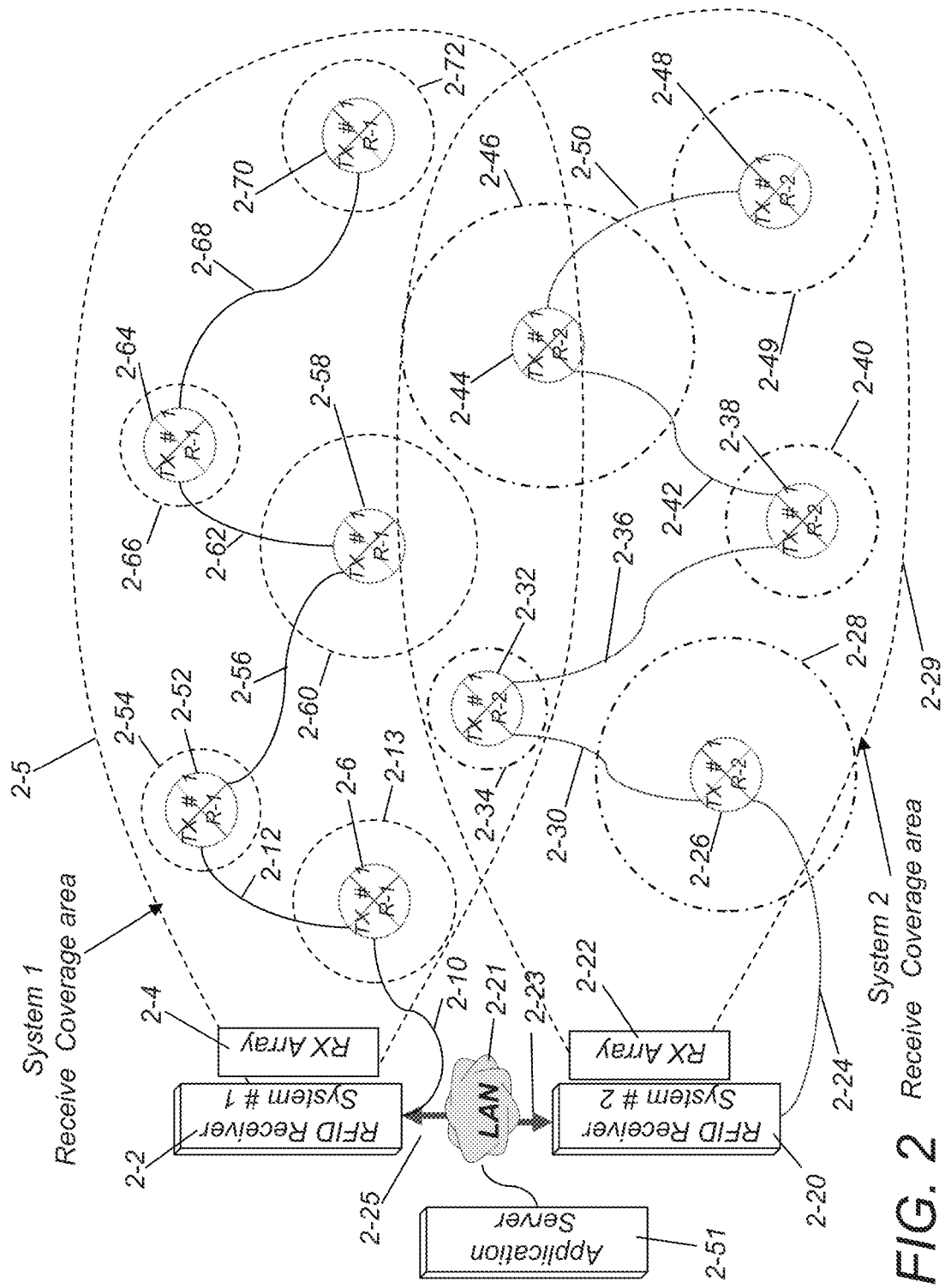
FIG. 2 is a network diagram of an RFID system including two RFID receiver systems and a distributed exciter architecture, where the exciters are connected to the RFID receiver system via cables, in accordance with an embodiment of the invention.
Figure 17A:
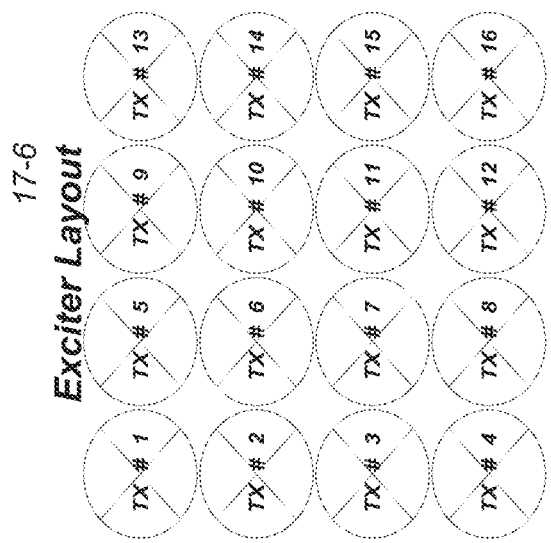

An exciter layout and a time line showing frequency channels assigned by an RFID application server in accordance with an embodiment of the invention are shown in FIGS. 17a and 17b. The timeline (17-4), depicts channel selection within the 900 MHz ISM band (17-10), versus the time line. In the illustrated embodiment at time '1', exciters 12, 15, 7, 11, 10, 3, 9, 4, 2, 1, 6, 14, 16, 8, 13, and 5 are activated for operation on channels 7, 16, 23, 25, 34, 40, 44, 46, 49, 50, 51, and 52 respectively. Note that more than one exciter might occupy a given channel and to the extent that these exciters are topologically co-located (for instance exciters 7 and 11) collisions can occur. Therefore, better choices could have been made in the frequency/exciter mapping plan. However, in the illustrated embodiment, random frequencies were assigned to the active exciters (17-8), which implies that co-location frequency collisions are possible (for instance on channel 23 between exciters 7 and 11 at time instance 1). An algorithm that can optimize frequency reuse and exciter location planning (14-12) (S/T/FDM) can be utilized to reduce overall interference degradation while adhering to regulatory constraints. An RFID system including two RFID receiver systems and a distributed exciter architecture in accordance with an embodiment of the invention is illustrated in FIG. 2. The RFID system includes two RFID receiver systems (2-2, 2-20), each with a separate array of receiver antennas (2-4, 2-22), and that are connected to a LAN (2-21) via connections (2-23, 2-25). A plurality of exciters (2-6, 2-52, 2-58, 2-64, 2-32, 2-28, 2-38, 2-48, 2-44, 2-72, 2-70) are connected to the two RFID receiver systems to create multiple interrogation spaces (2-13, 2-54, 2-69, 2-66, 2-34, 2-28, 2-40, 2-46, 2-49, 2-72). In the illustrated embodiment, the exciters form two groups, where each group is connected to the RFID receiver systems by a separate cable (2-24, 2-30, 2-36, 2-42, 2-50 and 2-10, 2-12, 2-56, 2-62, 2-68). The RFID application server (2-51) interfaces with the RFID receiver systems (2-2, 2-20), through the LAN (2-21), and manages the operation of the exciters, which includes control, command, coordination, calibration and optimization of the exciter interrogation spaces. The functions of RFID application servers in accordance with embodiments of the invention are discussed further below.

As can be seen from the embodiment illustrated in FIG. 2, each RFID receiver system has a separate receive coverage area (2-5, 2-29). Therefore, the use of multiple RFID receiver systems can enable an increase in the coverage area of the system. In addition, exciters in different coverage areas can be activated simultaneously. In the illustrated embodiment, several exciters (2-32, 2-44) occupy locations within the coverage area of both of the RFID receiver systems. Beam forming at each RFID receiver system allows a null to be placed in the other RFID receiver system's interrogation space hence avoiding collisions when two exciters (and RFID tags) transmit simultaneously in the different interrogation spaces.

Figure 3:
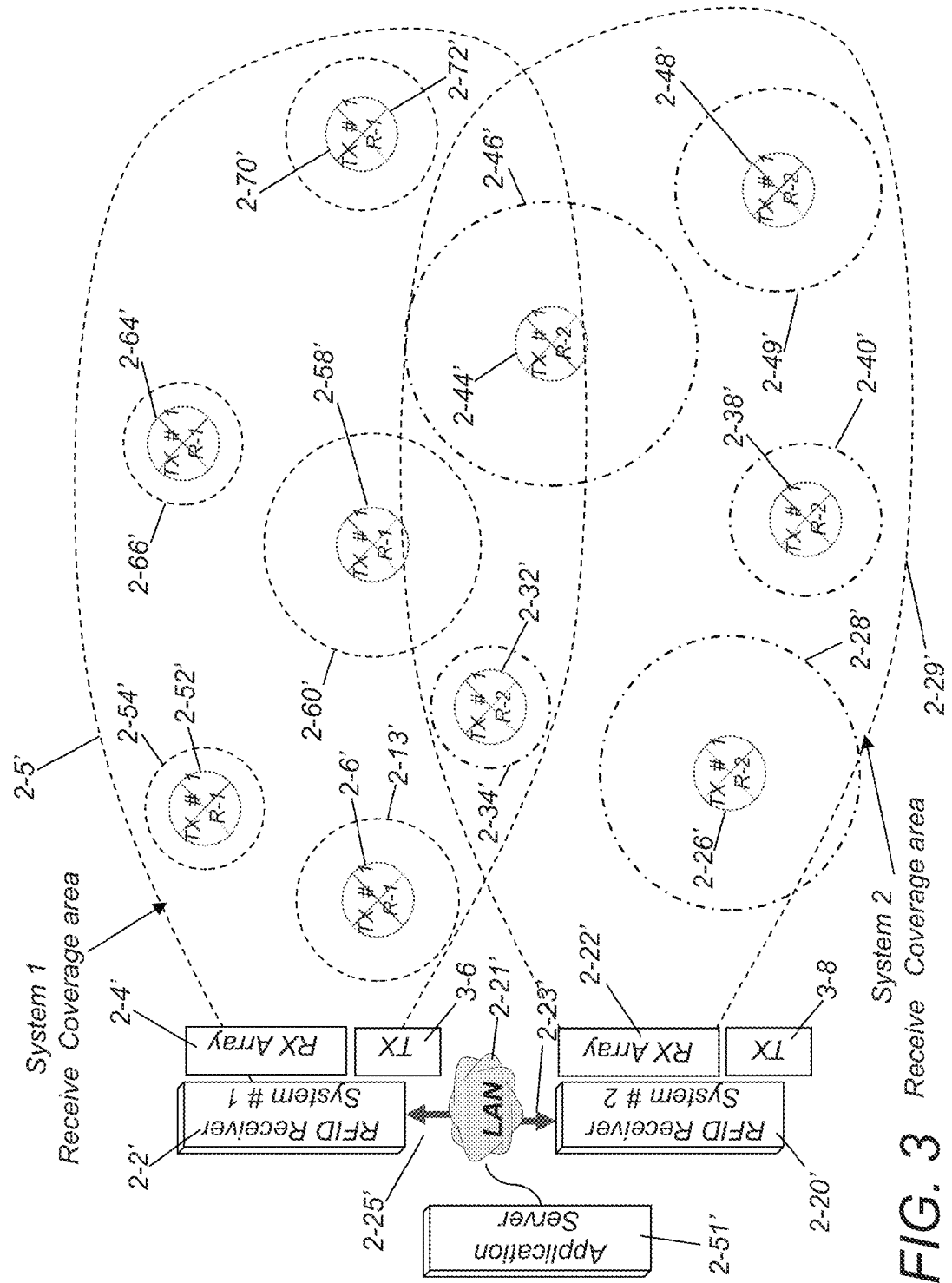
FIG. 3 is a network diagram of an RFID system including two RFID receiver systems and a distributed exciter architecture, where the exciters communicate with the RFID receiver system wirelessly, in accordance with an embodiment of the invention.

An RFID system including multiple RFID receiver systems and a distributed exciter architecture constructed using exciters that wirelessly communicate with the RFID receiver systems in accordance with an embodiment of the invention is illustrated in FIG. 3. The RFID system is similar to the system shown in FIG. 2 with the exception that the exciters are configured to communicate wirelessly with the RFID receiver systems. Each RFID receiver system (2-2', 2-20') has both receive (2-4', 2-22') and transmit antennas (3-6, 3-8). The transmit antenna radiates the forward link to the exciter, while the receive antenna array receives the signal from RFID tags, within the interrogation space of each exciter. The forward link also carries exciter identification (ID) number, command, control and management information. In the illustrated embodiment, the receive coverage areas for the two RFID receiver systems (2-5', 2-29') is shown. The overlap region between the coverage areas (2-5', 2-29') is managed through receive array beam-forming and frequency or time coordination of exciter operation. The RFID application server (3-7) interfaces with the two RFID receiver systems (2-2', 2-20') through the LAN (2-21') and manages the operations of the exciters that includes control, command, coordination, and calibration of the exciters as well as optimization of the interrogation spaces.

Figure 4:
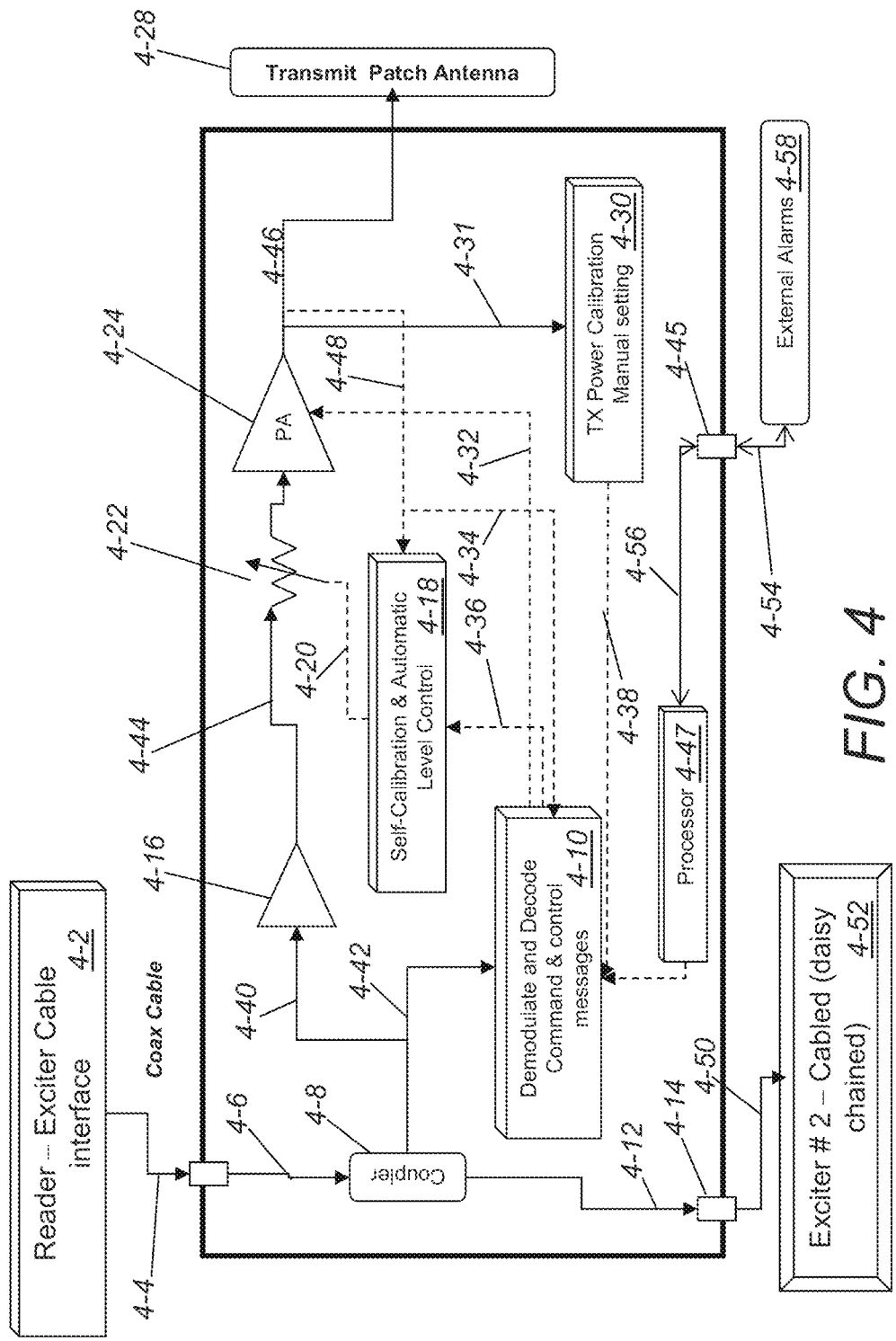
FIG. 4 is a semi-schematic circuit diagram of an exciter configured to be connected to an RFID receiver system via a coaxial cable in accordance with an embodiment of the invention.
Figure 5:
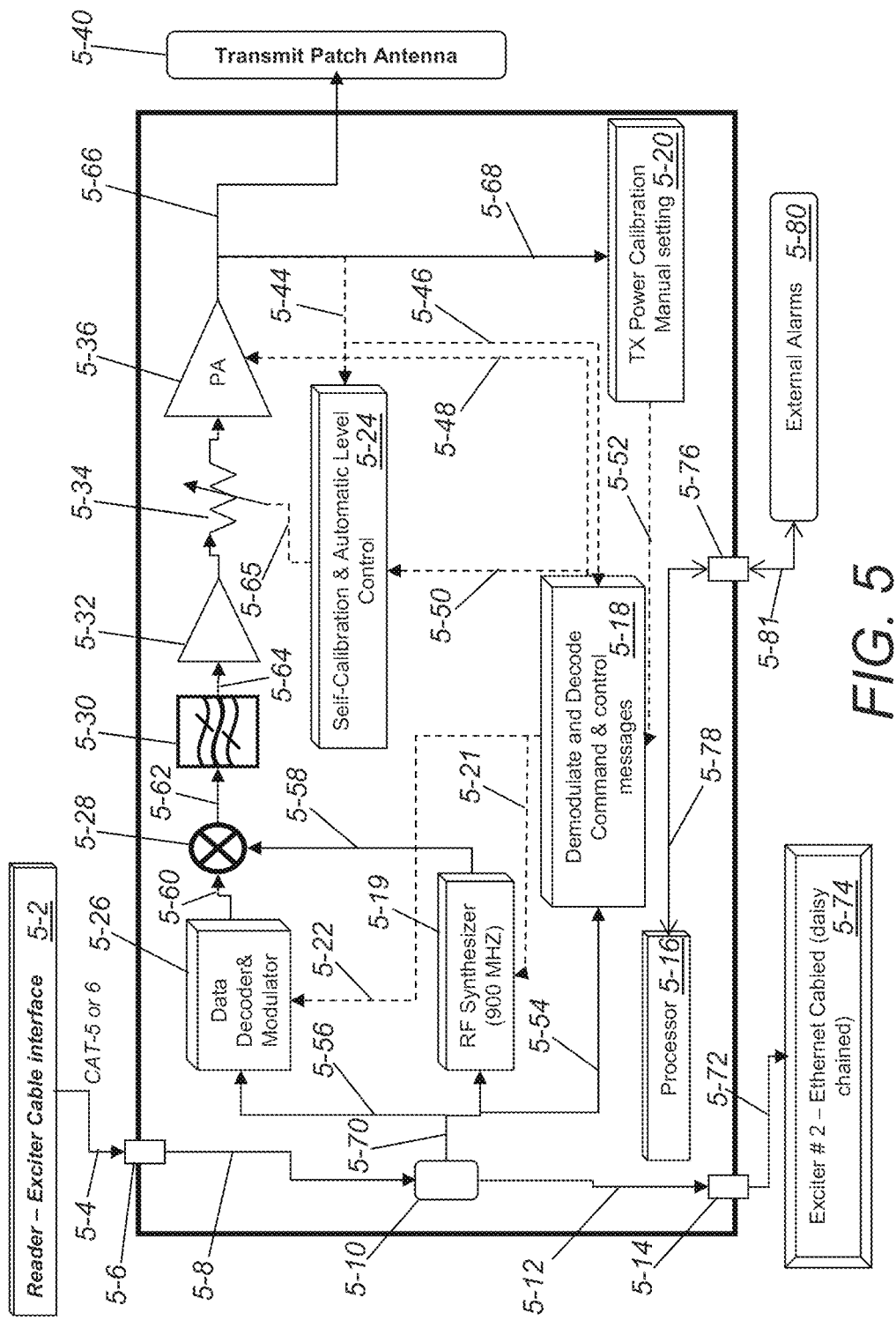
FIG. 5 is a semi-schematic circuit diagram of an exciter configured to be connected to an RFID receiver system via a twisted pair in accordance with an embodiment of the invention.

Implementations of wired exciters in accordance with embodiments of the invention are shown in FIGS. 4 and 5. FIG. 4 depicts an exciter in accordance with an embodiment of the invention that is configured to connect to an RFID system via coaxial cable. FIG. 5 depicts an exciter in accordance with an embodiment of the invention that is configured to connect to an RFID system via universal twisted pair (UTP) in which the exciter can be connected via CAT-5 or 6 wires.

In the embodiment illustrated in FIG. 4, a reader coaxial interface (4-2, 4-4, 4-6, 4-8, 4-12) and an interface (4-14) for daisy chaining a plurality of exciters (4-52) are shown. A signal received from an RFID receiver system typically carries control signals, which are processed by the demodulate and decode command and control messages module (4-10) and used to control the self calibration and automatic level control (ALC) loop (4-18, 4-20, 4-48, 4-34, 4-36, 4-32) or to set the transmit power in response to a manual setting (4-38, 4-30). Command and control messages for a wired exciter include messages that cause the exciter to go through power calibration (described below), to turn the transmit signal on or off, and to control the reporting of exciter status information (see description of hybrid wireless/wired exciter provided below with respect to FIG. 19). The received RF signal is split using a coupler (4-8) between the next exciter (4-52) and the transmit RF chain (4-40). The RF chain includes the receive low noise amplifier (4-16) and the ALC loop (4-22, 4-20, 4-24, 4-48) consisting of the feedback loop and the power amplifier (PA) (4-24). Output of the PA is followed by the transmit antenna patch (4-28). The exciter additionally has interfaces to one or more external alarms (4-58), which are interfaced to the internal processor (4-47).

Figure 18:
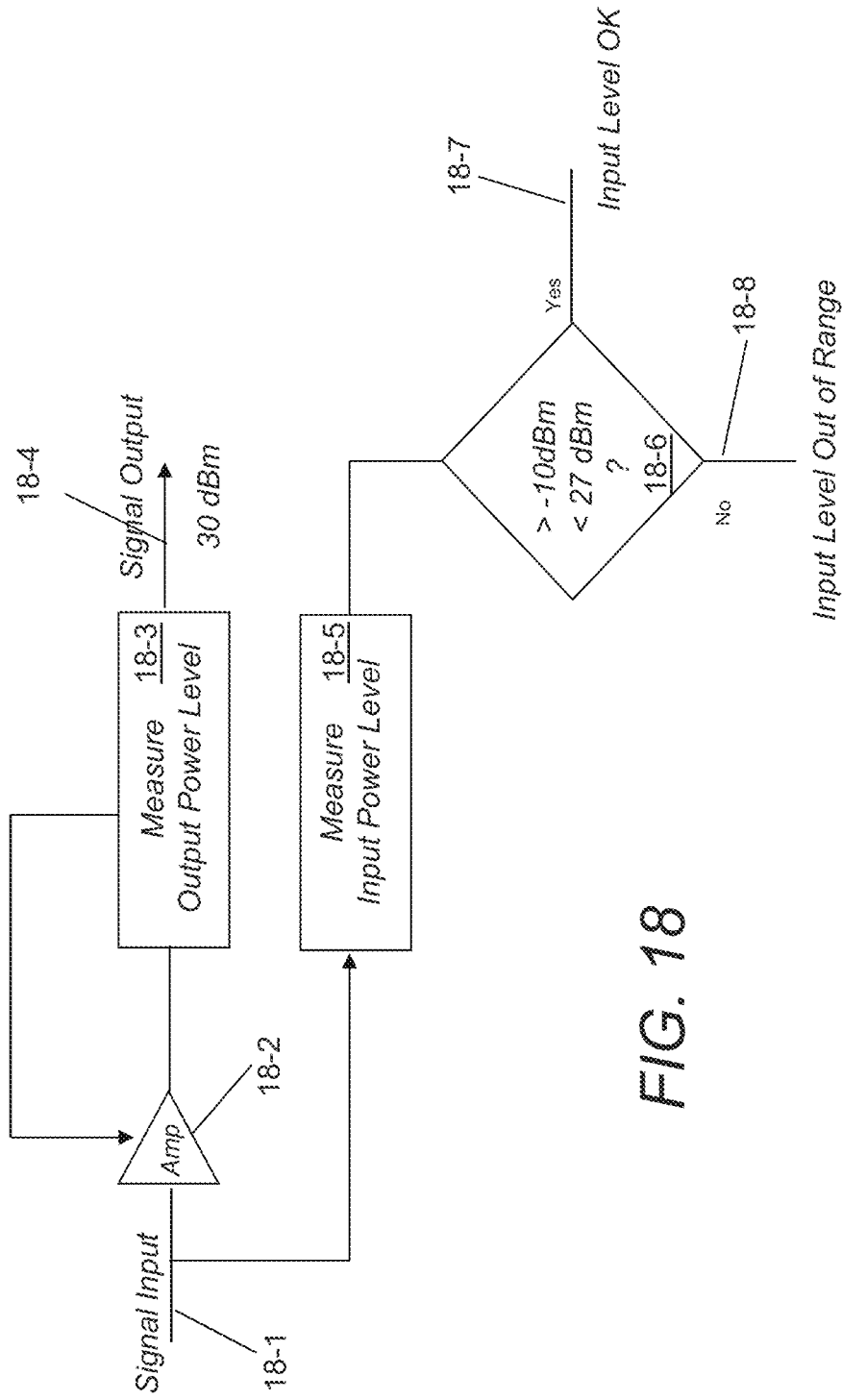
FIG. 18 is a block diagram illustrating input level condition measurement and an output level feedback control loop in accordance with an embodiment of the invention.

A self calibration and automatic level control loop in accordance with an embodiment of the invention is shown in FIG. 18. This block measures both input (18-1) and output (18-4) power levels. Input power levels between −10 dB Milliwatts and 27 dB Milliwatts are deemed to be within a tolerable range. If the input signal is within this range then the Output Power Level Measurement (18-3) block feeds back a signal to an amplifier module (18-2) to control the power amplifier's gain such that a total output power level of 30 dB Milliwatts is achieved. This output level is compliant with the FCC total radiated power restriction for a frequency hopped system operating in the 900 MHz band. In other embodiments, the total output power level of the exciter can be controlled in accordance with other application constraints. The embodiment illustrated in FIG. 18 is particularly useful for applications in which the exciter regenerates a received control signal. Wireless exciters that synthesize the RFID tag interrogation waveform in accordance with several embodiments of the invention can utilize an automatic control loop that simply monitors the output level and adjusts the transmitter power accordingly.

Turning now to FIG. 5, an exciter having a UTP interface, using CAT-5 or 6 cables (5-4, 5-72) is illustrated. When a UTP interface is used, the interface between the exciter and the RFID system (5-4) is at baseband. The exciter detects the baseband signal and modulates it to the specified RF frequency. When a coaxial interface is used, the interface is at RF, where the RF signal is repeated, and baseband carries the control signals. The raw data, which the RFID receiver system transmits to the exciter includes the control and command signals as well as the data that is modulated and transmitted to the RFID tag. Similar to the coaxial version, UTP exciters can be daisy chained (5-2, 5-4, 5-6, 5-8, 5-10, 5-12, 5-14, 5-72, 5-74) using UTP connectors. The demodulate and decode command and control messages module (5-18) decodes the command and control data used for configuring the RF synthesizer (5-22), the modulator (5-26), the self calibration and ALC control loop (5-24), and transmit power manual setting subsystem (5-20). The data decoder and modulator (5-26) detects and re-modulates transmit data in accordance with the relevant standard, and is followed by up conversion (5-28, 5-60, 5-58) and automatic gain control (5-32, 5-34, 5-36, 5-24). The amplified signal is provided via a connection (5-66) to the transmit antenna patch (5-40). The exciter additionally has interfaces (5-76) to one or more external alarms (5-80), which are interfaced to the internal processor (5-16).

Figure 6:
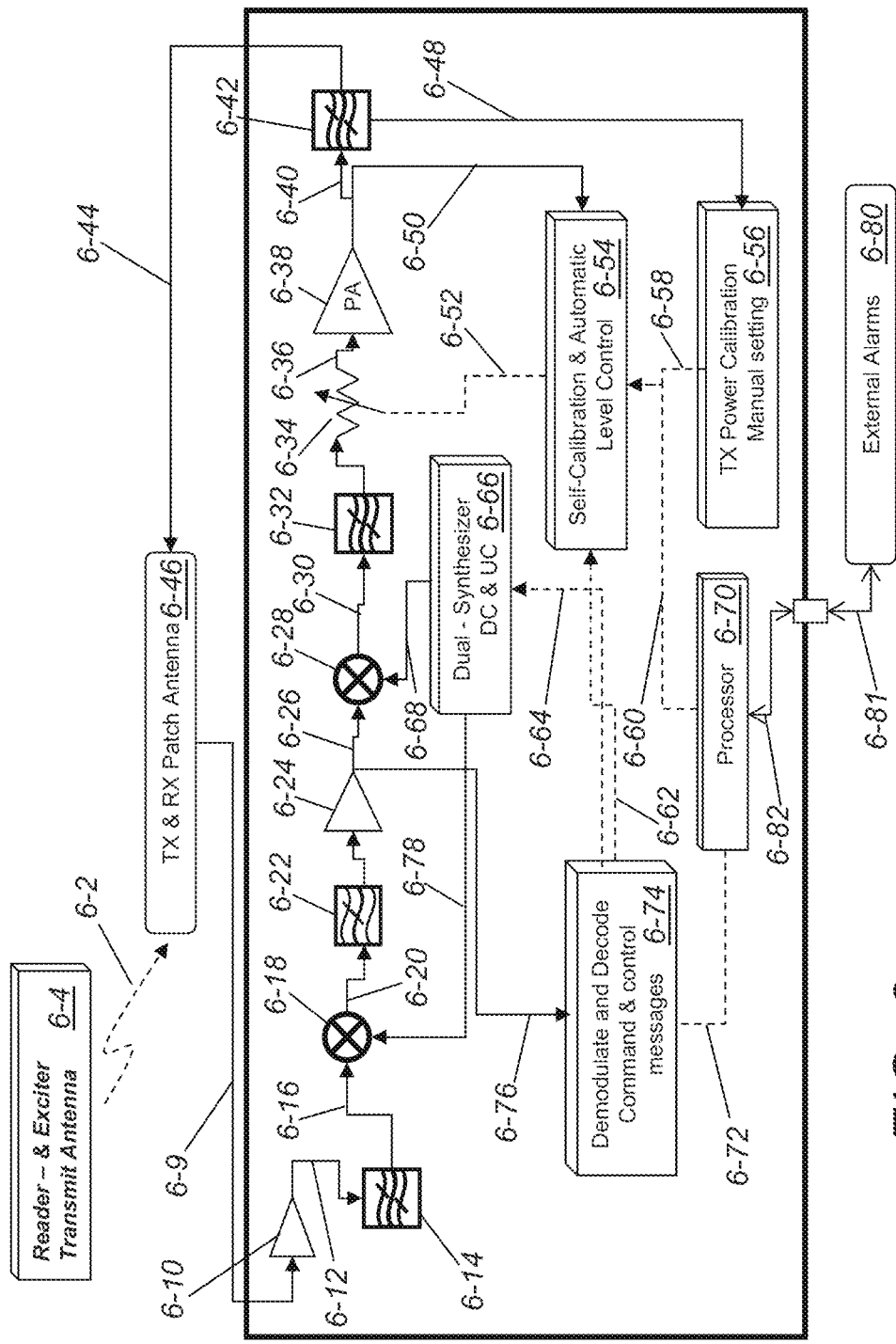
FIG. 6 is a semi-schematic circuit diagram of an exciter configured to wirelessly communicate with an RFID receiver system in accordance with an embodiment of the invention.

A wireless exciter in accordance with an embodiment of the invention is illustrated in FIG. 6. An RFID receiver system communicates with the wireless exciter on one frequency using the transmit antenna (6-4), while receiving data from the tags on a different frequency using its array of receiver antennas. In the illustrated embodiment, the wireless exciter acts as an RF repeater utilizing the 900 MHz ISM band. In other embodiments, other frequency bands can be used. The RF signal is down converted from the signal transmitted by the RFID receiver system transmit antenna (6-4), to baseband on the down conversion output connection (6-20), and then the baseband signal is up converted to a select frequency on the up conversion output connection (6-30). The specified frequencies for down and up conversions are communicated to the exciter using the RF command channel, using the 900 MHz ISM band by way of example. The same methodology can be employed in other frequency bands. The exciter patch antenna (6-6) is discussed further below and includes two feeds for receiving and transmitting RF signals. The RFID receiver system transmits to the exciters command, control, and transmit frequency plan information. The commands are detected by the demodulate and decode command and control messages module (6-74) and processed to control the dual synthesizer (6-66), the self-calibration and ALC loop (6-54, 6-36, 6-50, 6-38), and the transmit power manual setting loop (6-56, 6-48).

Command and control messages for a wireless exciter can include messages that cause the exciter to go through power calibration, to turn the transmit signal on or off, to control the reporting of exciter status information (see discussion of hybrid wireless/wired exciter below), to select a transmit frequency, and to set other parameters that define various transmit waveform characteristics. In other embodiments, the command and control messages can provide other instructions to an exciter.

The exciter configures the dual synthesizer (6-66) with the receive and transmit frequencies in response to instructions received from the RFID receiver system. The received RF signal is down converted (6-18) and then up converted (6-28) to the specified transmit frequency. The transmit power is set and calibrated using the self calibration and ALC module (6-54) through the control loops (6-52, 6-62, 6-50), and TX power calibration setting sub-system (6-56) through the control loops (6-48, 6-58). The RF path includes the required filters (6-22, 6-32, 6-42) and amplifiers (6-10, 6-24, 6-38) for maintaining signal integrity and quality. The output of the last stage (6-42) is followed by the antenna element (6-46), connected to the exciters transmit feed (6-46). The exciter additionally has interfaces to one or more external alarms (6-80), which are interfaced to the internal processor (6-70).

Figure 7:
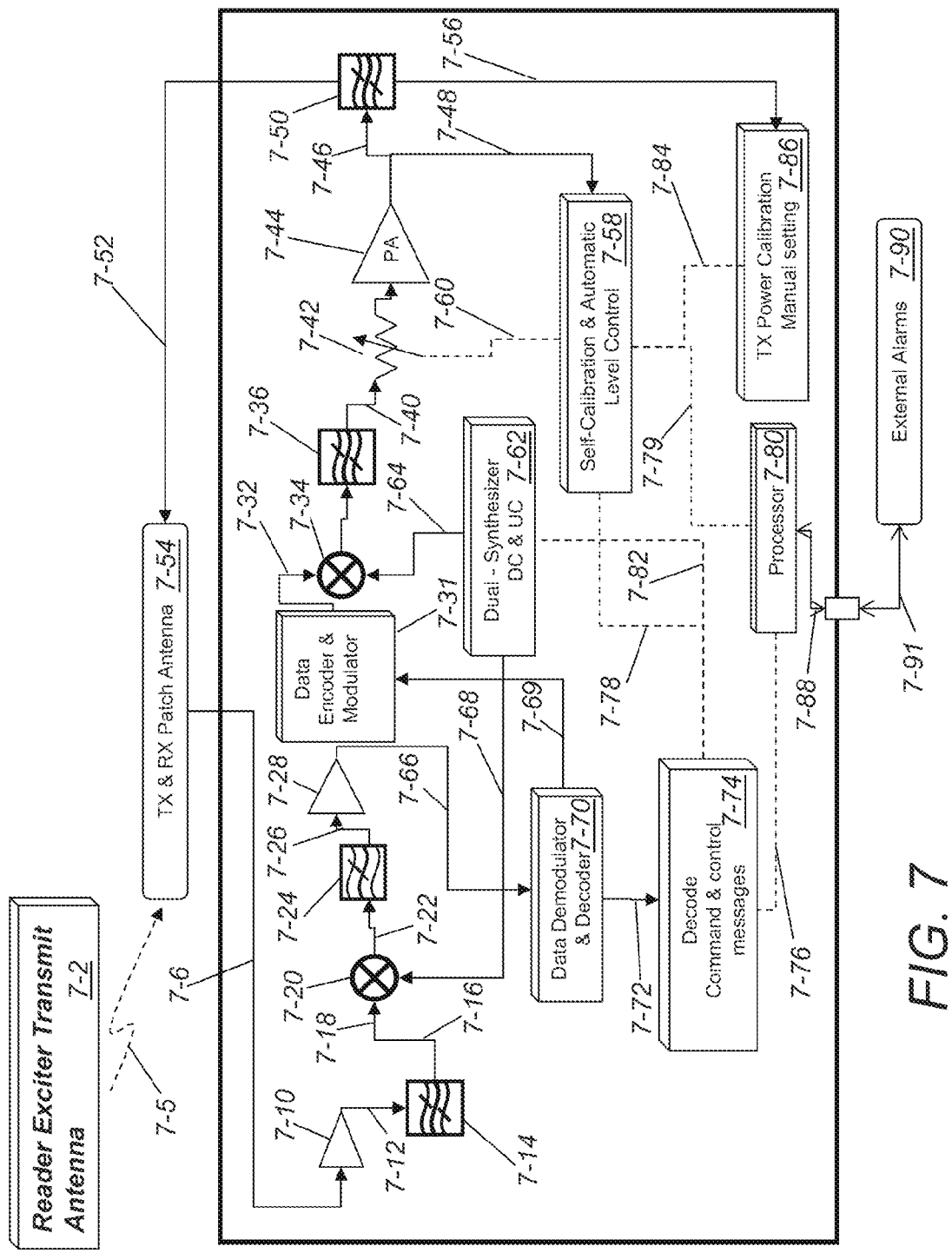
FIG. 7 is a semi-schematic circuit diagram of a wireless re-generative exciter in accordance with an embodiment of the invention.

A re-generative wireless exciter configured to demodulate, and detect the data provided by an RFID receiver system at a first frequency, and then modulate and transmit the RF signal at a different frequency in accordance with an embodiment of the invention is illustrated in FIG. 7. The forward link from the RFID receiver system to the exciter (7-2, 7-5) can carry control and command signals, as well as raw data. The reader forward link (7-5) to the exciter can use any modulation format such as spread spectrum or any simple suppressed carrier modulation. In the illustrated embodiment, the operating frequency and transmitted power of this link are configured to meet regulatory requirements. For example, U.S. Federal Communication Commission (FCC) standards specified in FCC Part-15 can be satisfied through frequency hopping.

The wireless exciter detects and decodes command and control data using the data demodulator and decoder module (7-70) and the decode command and control messages module (7-74). The command and control data is used by the wireless exciter to configure the RF synthesizer (7-62), the modulator (7-31), the self calibration and ACL control loop (7-58), and transmit power manual setting subsystem (7-86). The data encoder and modulator (7-31) detects and re-modulates transmit data per a standard, followed by up conversion (7-34) and the automatic gain control loop (7-42, 7-60, 7-44, 7-48) that is managed through the ALC loop control module (7-58). The amplified signal (7-52) is followed by the transmit antenna feed and patch (7-54). The exciter additionally has interfaces to at least one external alarm (7-90), which are interfaced to the internal processor (7-80).

Figure 19:
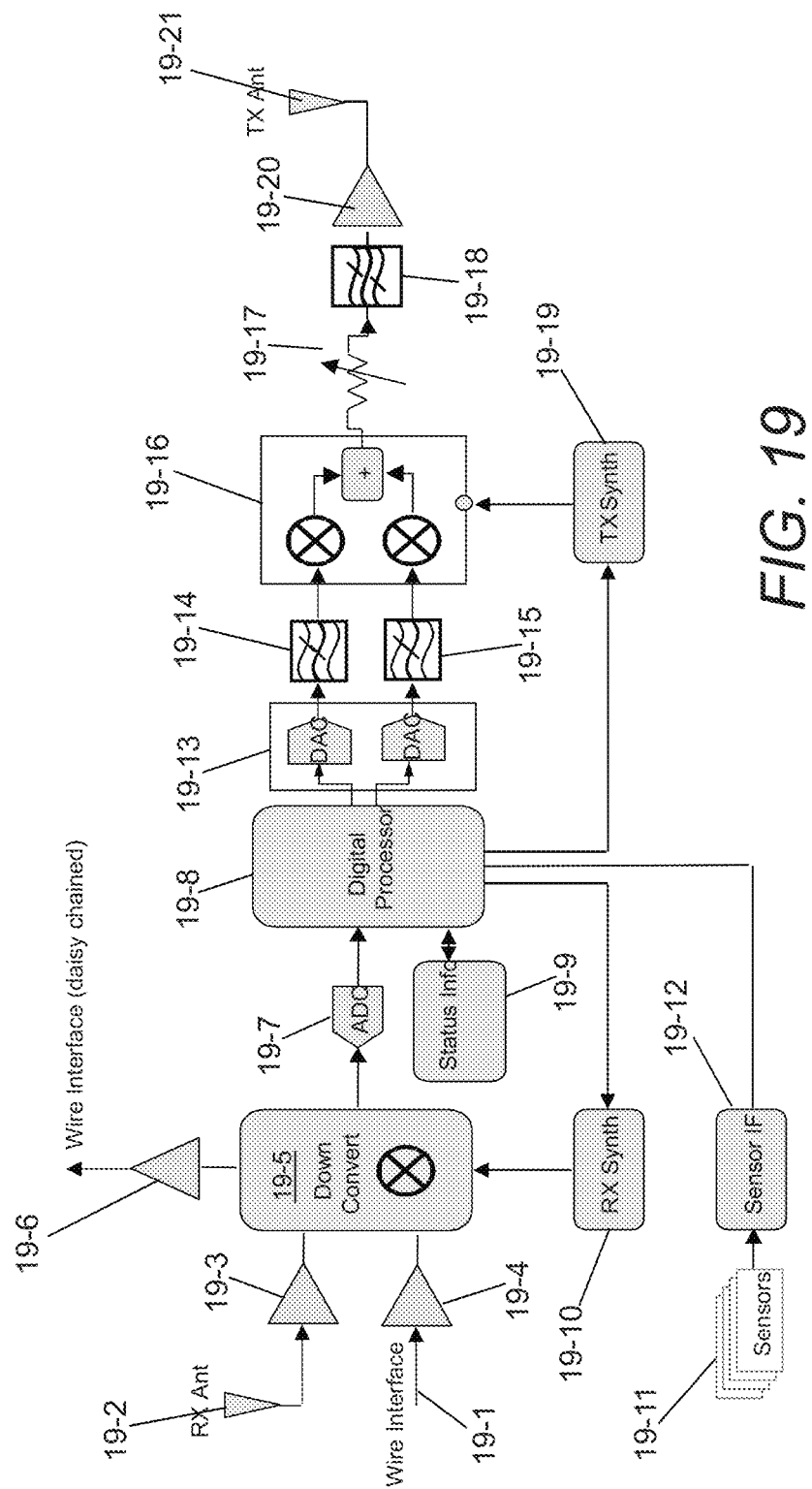
FIG. 19 is a block diagram showing a wireless or wireline controlled exciter with wireless status information backhaul enabling the wireless communication of messages from an exciter to an RFID receiver system in accordance with an embodiment of the invention.

A hybrid wireless/wireline exciter in accordance with an embodiment of the invention is illustrated in FIG. 19. In addition to the features supported by the previously described wired and/or wireless exciters, this design is able to wirelessly return status (19-9) or sensor (19-12) information via the same waveform nominally used by an RFID tag. The hybrid exciter consists of a wire interface (nominally coaxial cable) (19-1), a receive antenna interface (19-2), a frequency conversion block (19-5), and a wire output (daisy chain) interface (19-6). The wireless or wired interface signal undergoes frequency down conversion using a mixing frequency created by the receive frequency synthesizer (19-10). After analog to digital conversion (19-7) a digital processor (19-8) constructs modulated waveforms for digital to analog conversion (19-13). These waveforms may describe tag commands (i.e., signals used to manipulate tags) or exciter status information (i.e. information transmitted on a return channel to an RFID receiver system). In many embodiments, exciter status information includes sensor trigger event data (19-11, 12), exciter calibration information, and/or any other information describing the present state of the exciter or its surrounding environment. Low pass filters (19-14, 19-15) precede frequency up conversion (19-16) per a mix frequency determined by synthesizer block (19-19). A variable gain block (19-17) calibrates the output power level to not exceed a given threshold (for instance 30 dBm) prior to bandpass filtering the output signal (19-18). The final resulting signal is radiated through the transmit antenna (19-21).

The hybrid wireless/wireline exciter shown in FIG. 19 can generate a waveform similar to that of an illuminated tag to communicate information to an RFID receiver system. In many embodiments, the exciter can generate a waveform that emulates an illuminated RFID tag so that the same RFID receiver system hardware configuration can be used to both detect illuminated RFID tags and receive status signals from exciters. In other embodiments, the return channel from an exciter to an RFID receiver system is a conventional wireless communication channel and the RFID receiver utilizes separate receiver configuration/hardware for communicating with exciters and receiving information from RFID tags.

Figure 8:
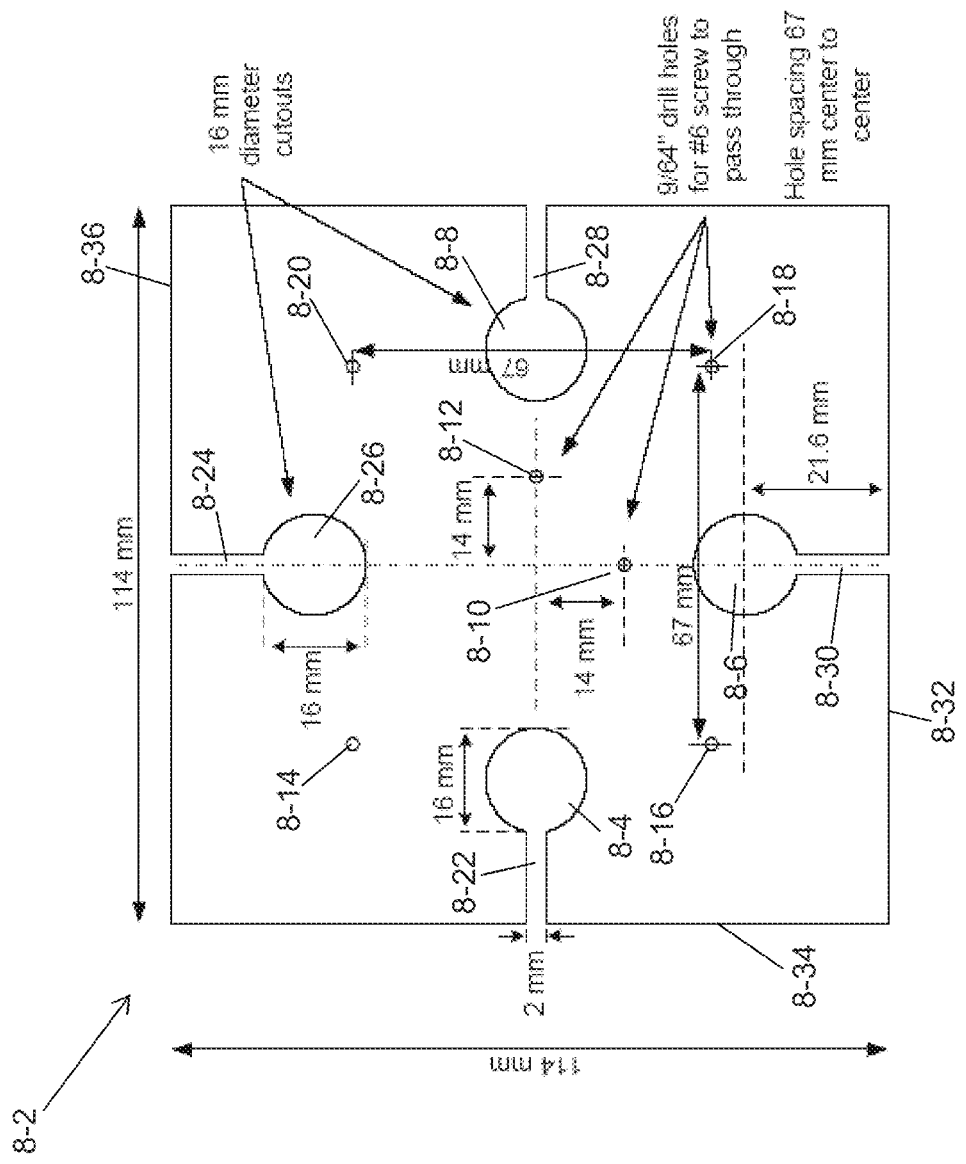
FIG. 8 is a plan view of an antenna element in accordance with an embodiment of the invention.

An antenna that can be used in the construction of a reader transmit and receive array, or exciter transmit and receive element in accordance with an embodiment of the invention is illustrated in FIG. 8. The antenna is fabricated using a brass, copper or Aluminum plate (8-2). The plate (8-2) has four slots (8-22, 8-24, 8-28, 8-30), which end with a circular cut through (8-4, 8-6, 8-8, 8-26). There are two through holes (8-10, 8-12) for connecting the transmit and receive feeds, and four through holes (8-14, 8-16, 8-18, 8-20) for plastic standoffs.

Figure 9:
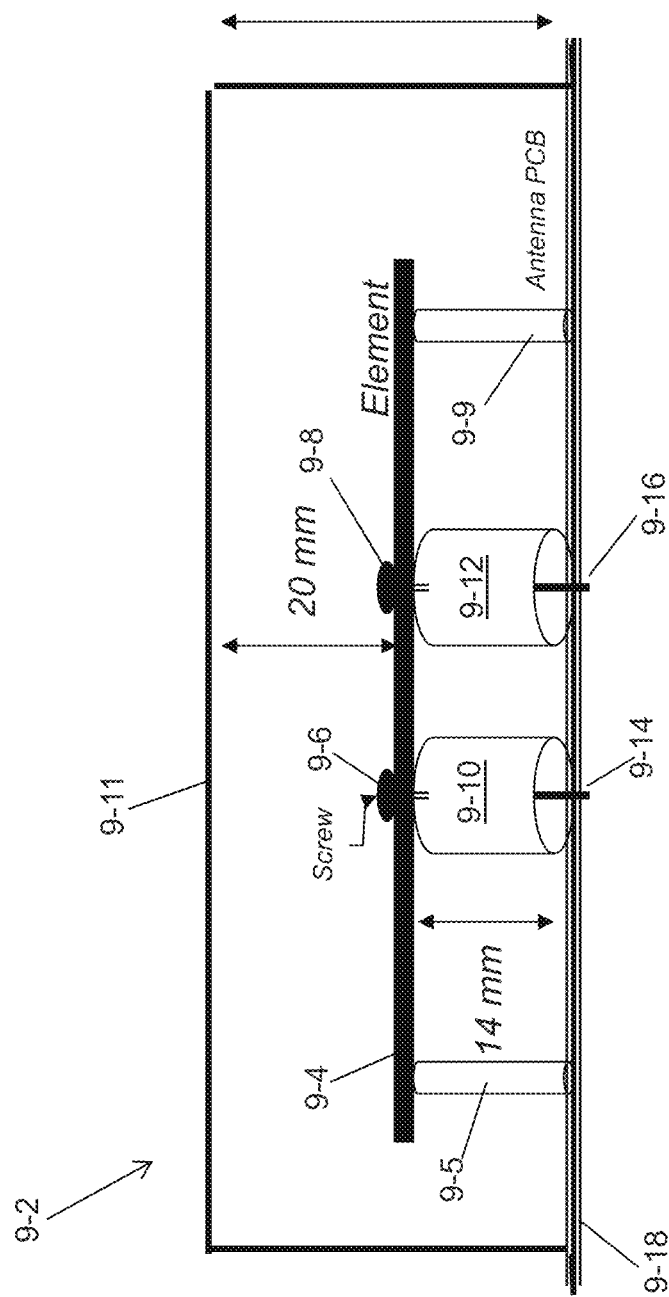
FIG. 9 is a cross-sectional view of an antenna assembly in accordance with an embodiment of the invention.

An antenna element similar to the antenna shown in FIG. 8 mounted in a housing in accordance with an embodiment of the invention is shown in FIG. 9. In the antenna assembly (9-2), bushings (9-10, 9-12) connect the antenna element (9-4) to the Printed Circuit Board (PCB) (9-18), which also serves as the antenna ground plane. The connection is through the bushing's pins (9-14, 9-16) to the PCB and through screws (9-6, 9-8) to the element. The antenna element is covered using a radome cover (9-11) at a fixed distance from the element. Plastic pins (9-5, 9-9) provide the antenna element with additional stability.

Figure 10:
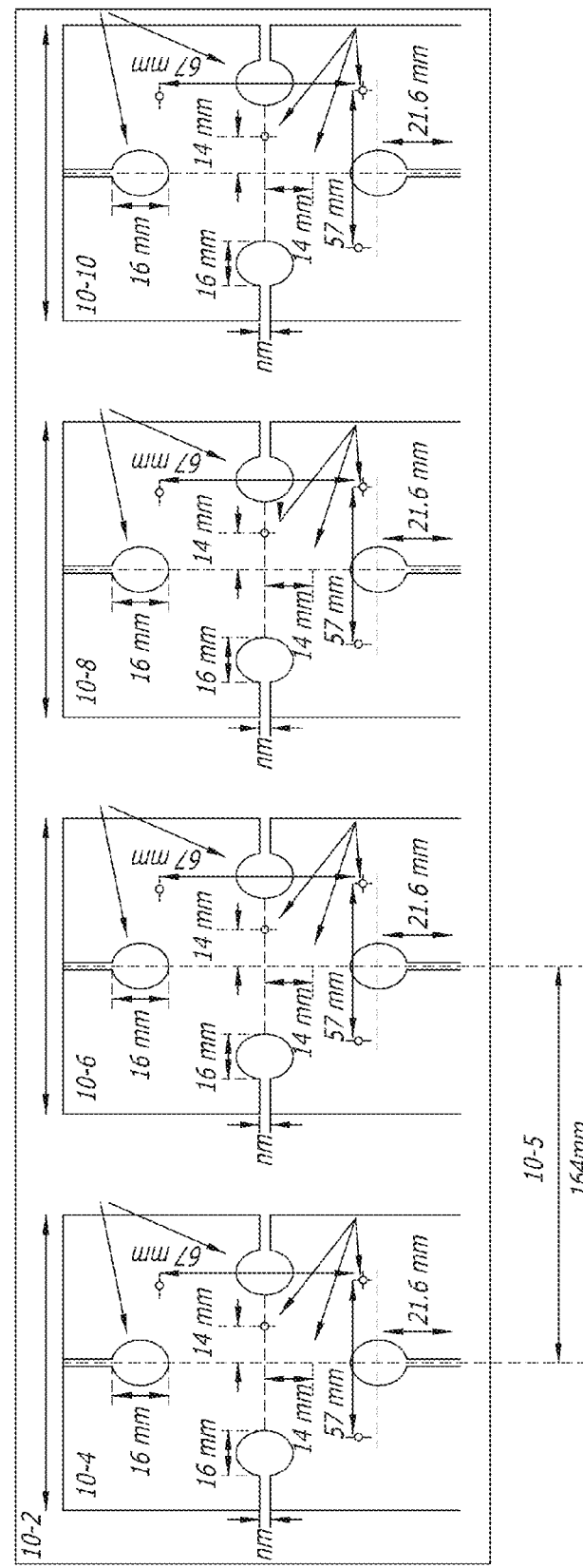
FIG. 10 is a plan view of an array of receiver antennas in accordance with an embodiment of the invention.
Figure 11:
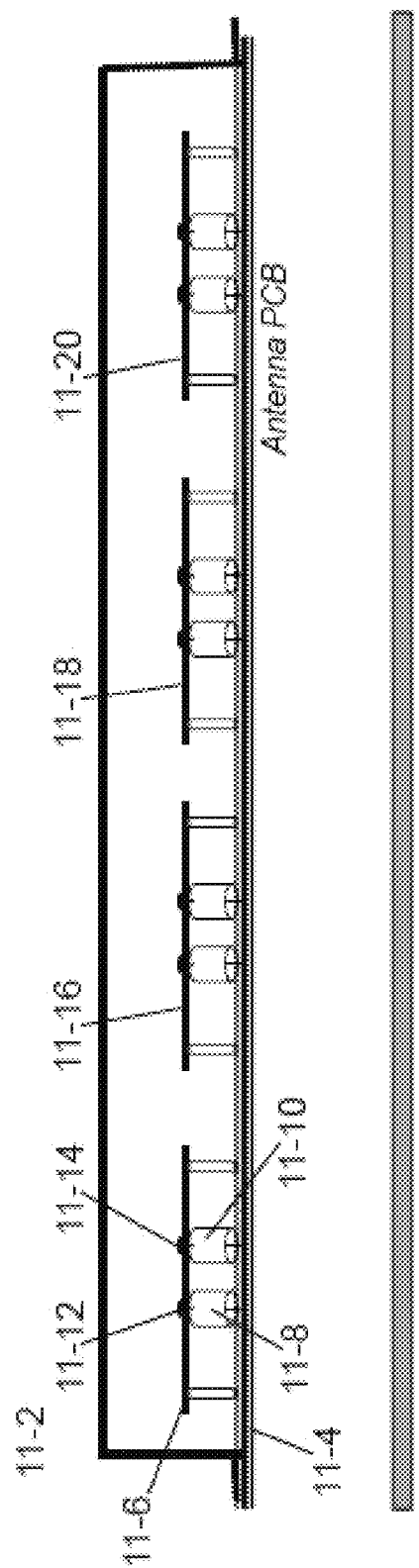
FIG. 11 is a cross-sectional view of an array of receiver antennas in accordance with an embodiment of the invention that is similar to the array shown in FIG. 10.
Figure 12:
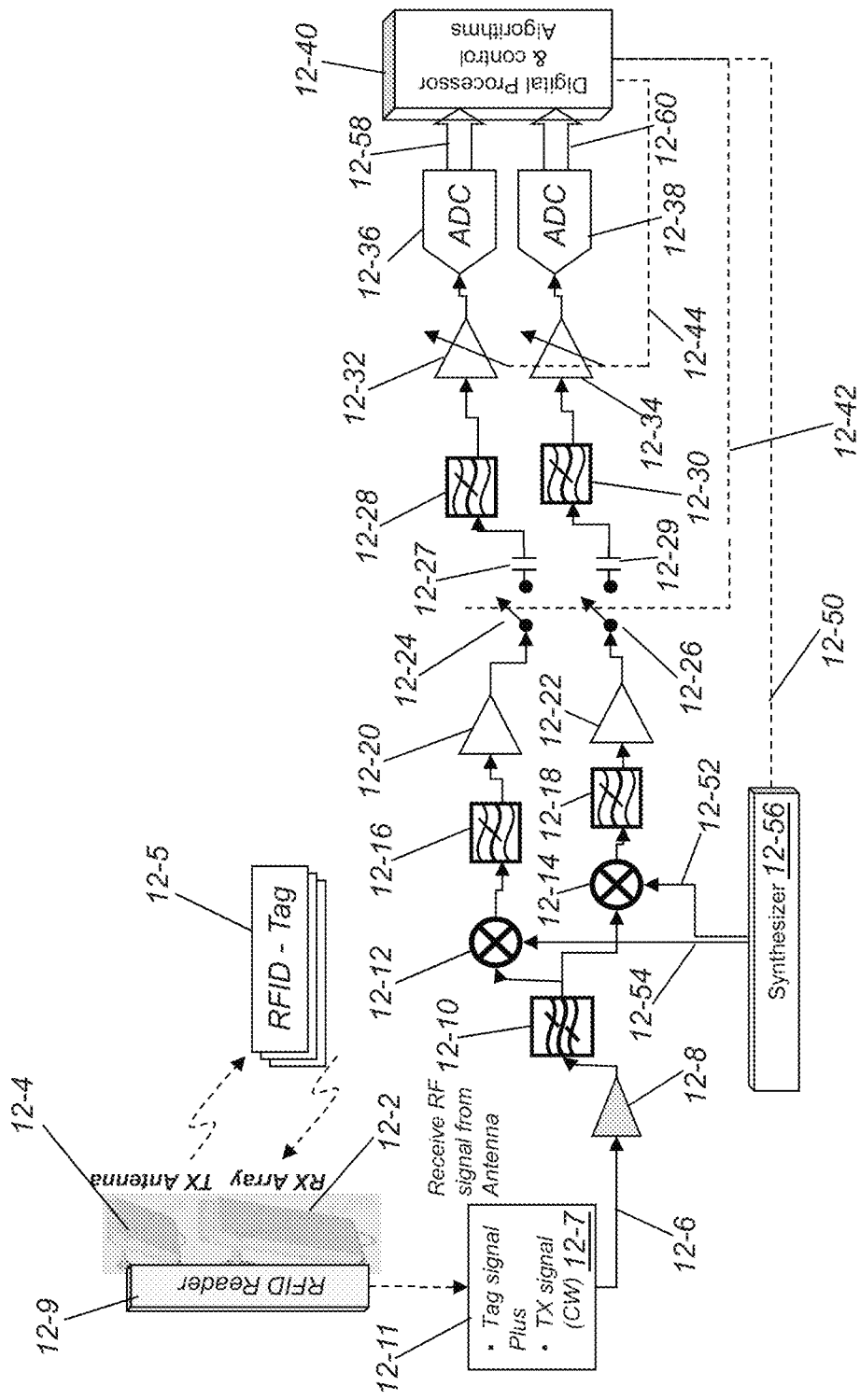
FIG. 12 is a semi-schematic circuit diagram of a transmit and receive RFID reader.
Figure 13:
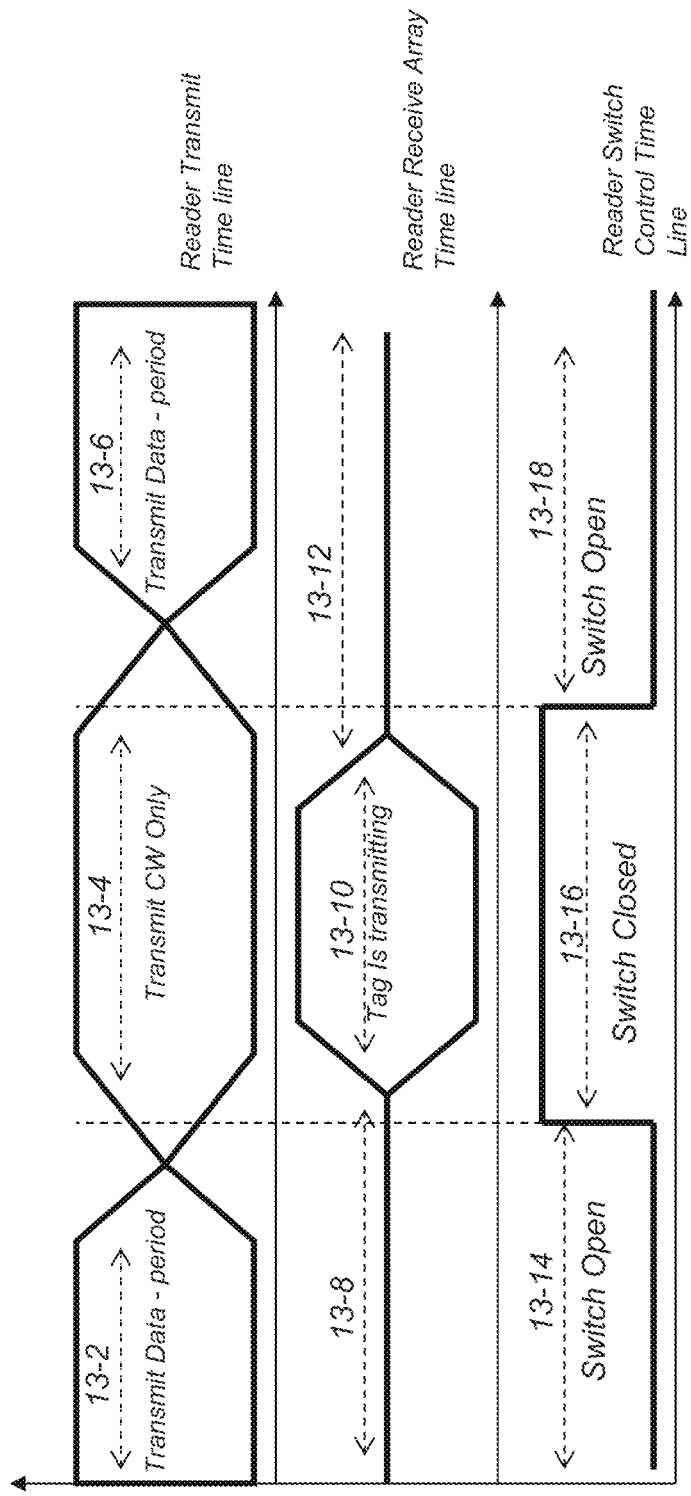
FIG. 13 is a chart conceptually illustrating tag protocol timing.

A receive array configuration in accordance with an embodiment of the invention is depicted in FIGS. 10 and 11. The array is composed of four elements, similar to the antenna assemblies (9-2) shown in FIG. 9. The four antenna elements (10-4, 10-6, 10-8, 10-10) are connected to the antenna PCB (10-2). FIG. 11 shows the cross-sectional view of the PCB (10-2), bushings (11-8, 11-10), elements (10-4, 10-6, 10-8, 10-10), and the radome cover (11-2). In the illustrated embodiment, the element center-to-center separation is 164 mm (10-5). In other embodiments, the element center-to-center separation is determined according to the requirements of the application.

Although specific antenna configurations are shown in FIGS. 8-11, other antenna configurations capable of transmitting and/or receiving signals in accordance with a specific application can be used in embodiments of the invention.

Figure 14:
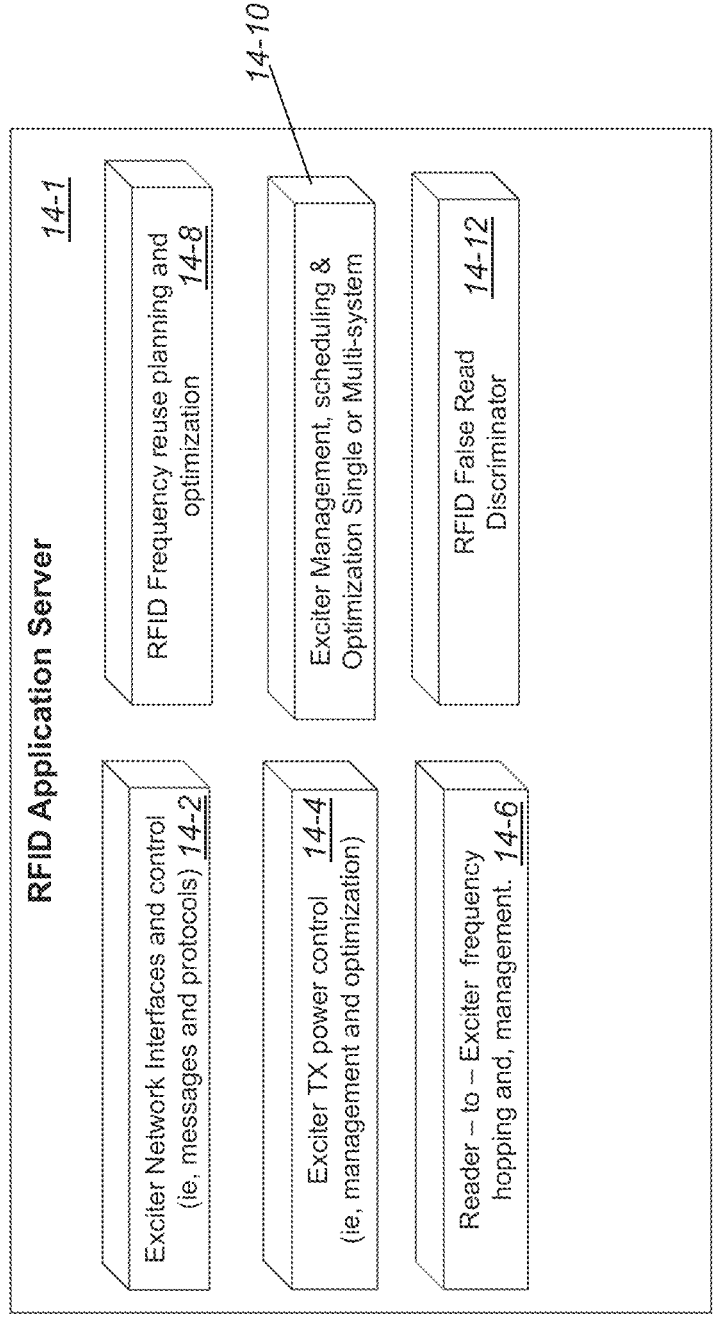
FIG. 14 is a conceptual illustration of software used to configure an RFID application server in accordance with an embodiment of the invention.

In a number of embodiments, the operation of exciters in a distributed architecture is managed and controlled by the RFID system using command, control and processing algorithms. A series of processes that are coordinated by the RFID system to control the operation of distributed exciters in accordance with an embodiment of the invention is illustrated in FIG. 14. The processes (14-1) include an exciter network interface and control process (14-2), which provides the control messages, and manages communication protocols. In many embodiments, various processes determine the manner in which the exciters are to be controlled and the exciter network interface and control process (14-2) is used to communicate the control information to the exciters. In the illustrated embodiment, exciter transmit power control process (14-4), optimizes, controls, manages, and calibrates the transmit power from each exciter, as specified by the user. In several embodiments, messages containing transmit power control information are provided to the exciters using the exciter network interface and control process (14-2).

A reader to exciter frequency hopping and management process (14-6), combines with an exciter management, scheduling and optimization process (14-10), and RFID frequency reuse, planning and optimization process (14-8), to optimize the operations of single and multi-system RFID receiver system deployment. The exciter frequency hopping and management process (14-6) coordinates frequency hopping. In several embodiments, the frequency hopping and management process assigns random frequencies to active exciters. In other embodiments, the process operates in conjunction with the RFID frequency reuse, planning and optimization process (14-8) to employ an algorithm that optimizes frequency reuse based upon exciter location. In many embodiments, other algorithms appropriate to the application are employed for the assignment of frequencies. In several embodiments, the exciter management, scheduling and optimization process (14-10) coordinates the activation of exciters. In a number of embodiments, the process periodically polls exciters. In several embodiments, sensors detect the likely presence of items bearing RFID tags within an interrogation zone of an exciter and the sensor information is used by the process in the controlled activation of individual exciters.

Figure 15:
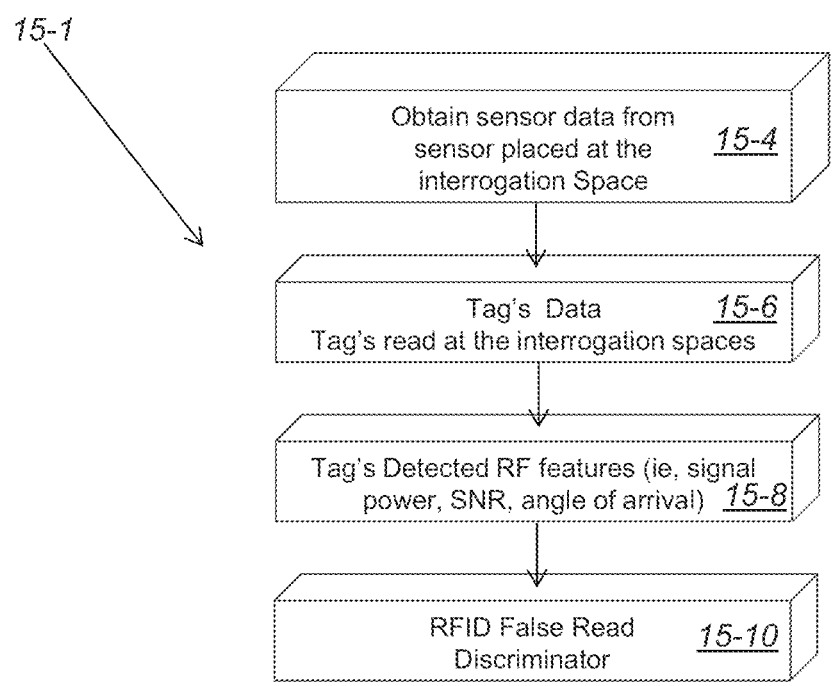
FIG. 15 is a flow chart of a process for determining whether RFID tag information was detected from a tag within a predetermined interrogation space in accordance with an embodiment of the invention.

An RFID false read discriminator process (14-12), detects and flags RFID tag's which don't belong to a specified interrogation space. An RFID false read discriminator process in accordance with an embodiment of the invention is illustrated in FIG. 15. The process (15-1) obtains (15-4) sensor data from the interrogation space, detects (15-06) RFID tag data, which includes a tag's identification code, and determines (15-8) RF features of detected tag information, which include signal strength, signal to noise ratio (SNR) and direction of arrival. The process uses the collected sensor data, RFID tag data and RF features to determine whether the RFID tag data was read from a tag located outside of the interrogation space of the exciter that was activated by the RFID system. A variety of processes can be used to determine whether RFID tag data was read from a tag located outside an interrogation space based upon collected information similar to the information described above. Specific processes are discussed further below.

Figure 16:
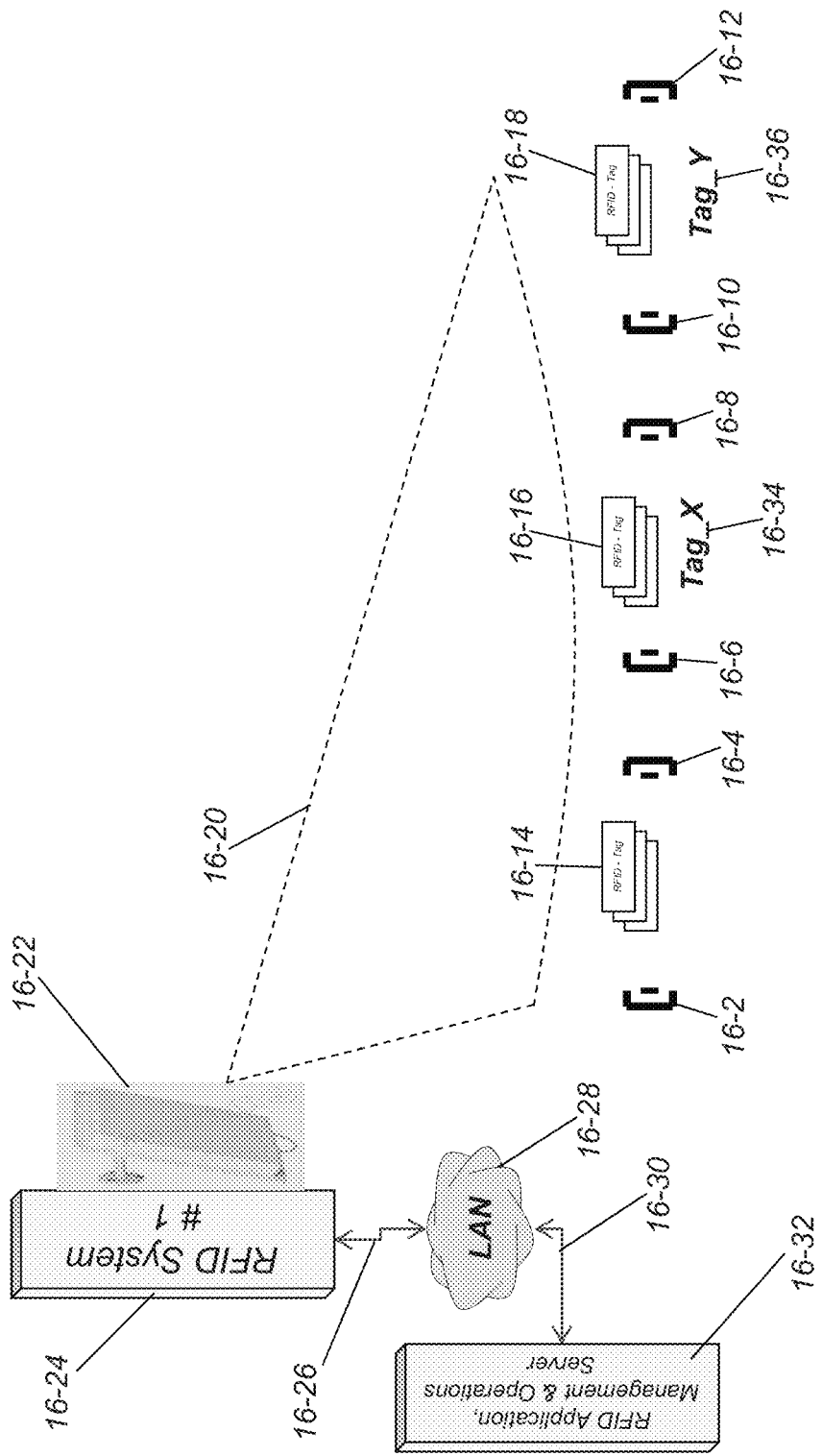
FIG. 16 is a semi-schematic diagram showing an RFID system including a distributed exciter architecture in which exciters are paired to facilitate tag read location discrimination in accordance with an embodiment of the invention.

A deployed RFID system that includes a distributed exciter architecture in accordance with an embodiment of the invention is illustrated in FIG. 16. The deployment includes three interrogation spaces (16-14, 16-16, 16-18). In this deployment each interrogation space utilizes two exciters (16-2, 16-4 & 16-6, 16-8, & 16-10, 16-12). In many embodiments, the RFID system illuminates each interrogation space utilizing processes similar to the process illustrated in FIG. 15 to identify whether RFID tag data was read from a tag located within an exciter's interrogation space.

For example, when intending to read an RFID tag in a first interrogation space (16-16) the reader (16-22) can read tag "x" (16-34), and tag "y" (16-36). Data can be collected from other exciters, (e.g. tag "x" was read by exciters (16-6 & 16-8), while tag "y", was read by exciter (16-10, 16-6 & 16-12)), and the SNR for each signal compared (e.g., the SNR for tag "y" was lower compared to tag "x" when using exciters (16-6 & 16-8)). Using the collected information, an RFID application server can conclude that tag "y" (16-36), does belong to the first interrogation space (16-16).

The process used to determine whether RFID tag data is associated with an RFID tag located within an interrogation space can depend upon the application. In several embodiments, read rate information is used to identify relationships between RFID tags and exciters. Various processes that rely on read rates to draw conclusions concerning the location of RFID tags in accordance with embodiments of the invention are discussed below.

Many processes in accordance with embodiments of the invention determine the location of RFID tags from which information has been received by gathering information regarding RFID tag read rates and combine the read rate information with a topologic description of exciters and regions in order to determine tag location. Combining read rates with a topologic description can enable false read detection when a tag is not located within a region of interest by approaching the problem of read discrimination in terms of 'event sensing'. In particular the RFID system is interested in events that involve tags moving from one 'hypothesis region' to another. These events can be called 'transition events'. In several embodiments, probabilities of transition events (or transition hypotheses) inform the read discrimination process.

A transition hypothesis can be determined by defining the quantity $p(x_a|y_{\{poll,sense\}}^{e\,j})$ as the posteriori probability that a tag is in hypothesis region $x_a$ using tag observations $y_{\{poll,sense\}}^{e\,j}$ taken due to exciter $e_j$, which is in either a polling (poll) or a sensor (sense) driven mode. An exciter in a polling driven mode is activated by an RFID receiver system in a way that is strictly periodic. An exciter in sensor driven mode is enabled when a sensor event (such as a light beam break or machine vision motion) is detected. The majority of the time, exciters run in a polling mode in which access to the RFID receiver system is divided in time equally between the set of possible exciters. This occurs until a sensing event is triggered, at which point a subset of exciters is granted exclusive access to the RIFD receiver system.

Figure 20:
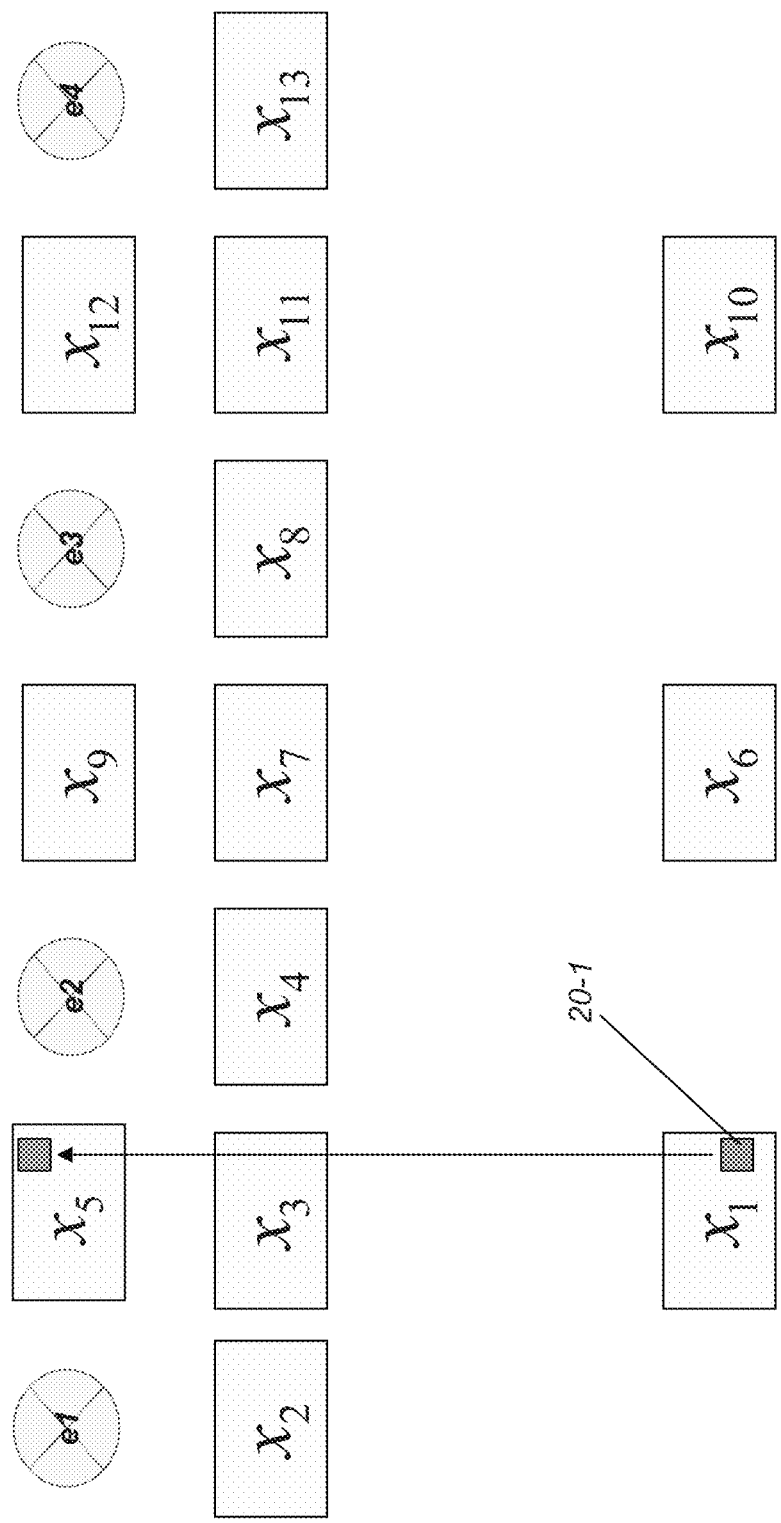
FIG. 20 is a conceptual illustration of the movement of an RFID tag between two hypothesis regions.

An event associated with a transition hypothesis can be illustrated pictorially. A series of regions of interest and a plurality of distributed exciters are shown in FIG. 20. In the illustrated embodiment, an item bearing an RFID tag (20-1) moves from a first location $x_1$ to a second location $x_5$. The posteriori probability that a tag has moved from hypothesis region $x_1$ or $x_3$ to region $x_5$ can be determined by evaluating the probability:

$$\frac{(p(y_{poll}^{e_1}|x_1)+p(y_{sense}^{e_1}|x_5))(p(y_{poll}^{e_2}|x_1)+p(y_{sense}^{e_2}|x_5))}{(p(y_{poll}^{e_1}|x_3)+p(y_{sense}^{e_1}|x_5))(p(y_{poll}^{e_2}|x_3)+p(y_{sense}^{e_2}|x_5))}$$

$$\frac{}{C_x p(y)}$$

The normalizing parameters $C_x$ and $p(y)$ can be dropped (normalization can be handled as a final separate step). The probability of similar transition events can be described more generally with the following product of sums:

$$\prod_{a \in A_{origin}} \prod_{e \in E_{dest}} (p(y_{poll}^e|x_a)+p(y_{sense}^e|x_{dest}))$$

$A_{origin} \equiv$
  Set of hypotheses that can transition to the destination hypothesis $E_{dest} \equiv$ Set of exciters surrounding the destination hypothesis The remainder of this description focuses on the method through which the system obtains sums of the form $p(y_{poll}^e|x_a)+p(y_{sense}^e|x_{dest})$.

Figure 21:
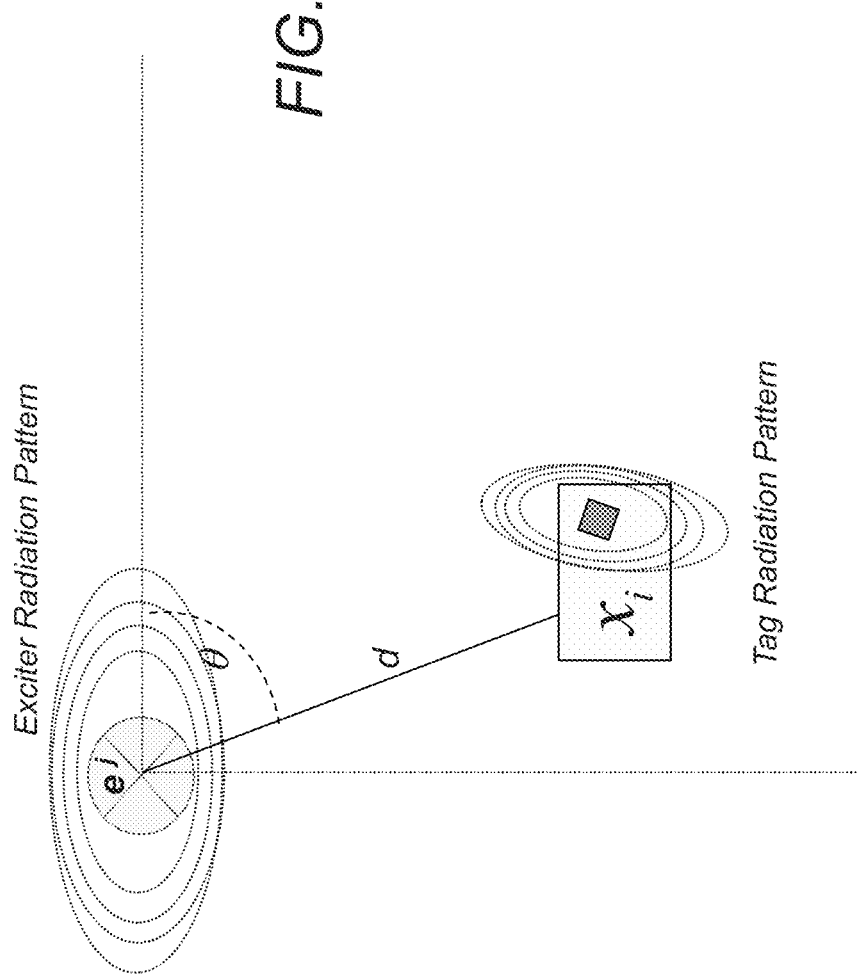
FIG. 21 is a conceptual illustration of the spatial relationship between an exciter and an RFID tag that can be used to determine excitation link margin in an exciter/hypothesis topology, exciter transmit power, exciter radiation pattern, and typical RFID tag radiation pattern in accordance with embodiments of the invention.

We now refer to FIG. 21 which provides a topological description of exciter $e^j$ in relation to hypothesis region $x_i$. For each such pairing, it is possible to determine the typical excitation link margin (the amount of power arriving at a tag above and beyond the absolute minimum power required to activate the same tag). This link margin is well approximated with knowledge of excitation power level, $P_t$, angle from exciter boresight $\theta$, mean distance from exciter to hypothesis, d, and the expected exciter and tag radiation patterns.

Figure 22:
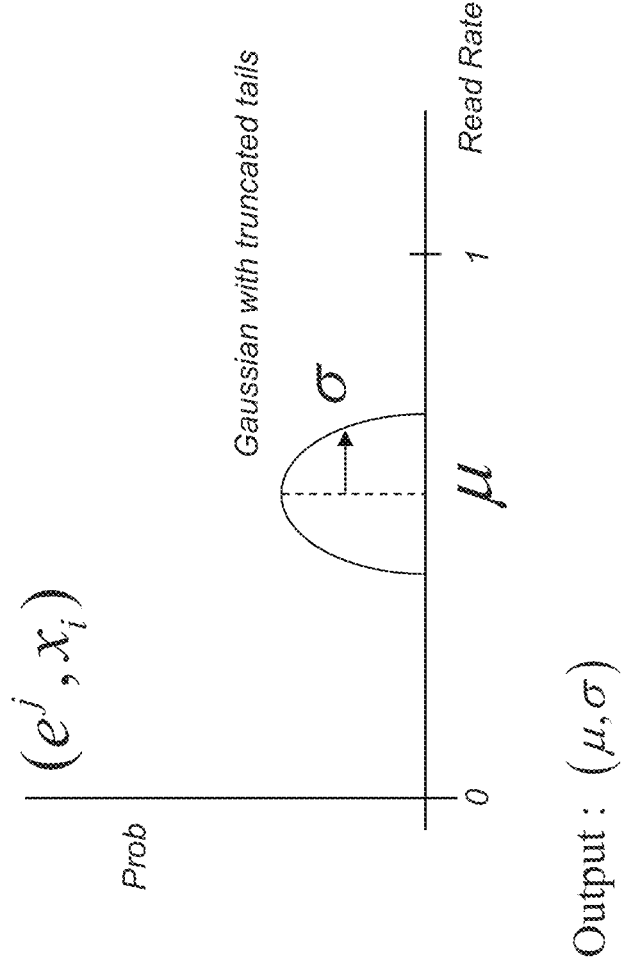
FIG. 22 is a chart illustrating a probability mass function that describes the probability of RFID tag read rates for RFID tags located within a given hypothesis region under excitation by a given exciter in accordance with an embodiment of the invention.

Referring now to FIG. 22, the resulting excitation link margin from FIG. 21 is used to generate a probability mass function (pmf) that describes the likelihood that a tag will be read a given percentage of the time (Read Rate) if it is located within hypothesis region $x_i$. Read Rate (RR) is determined empirically by counting the number of times a tag is read in a fixed time interval and dividing this quantity by the number of total possible reads that were possible in the same time duration (note that a read rate is labeled according to the triplet of exciter ID, hypothesis region, and tag ID). Read Rates will be indexed by exciter (e) and hypothesis region ($x_j$) using notation $RR_{e,x_j}$. The related Read Rates are taken by an exciter (e) running in polling or sensor driven modes implicitly as determined by the location of a hypothesis region. Destination hypothesis regions are typically read using a sensor driven mode. Given the preceding definitions it is possible to specify the products of interest as a point on a Gaussian probability mass function, $$p(y_{poll}^e|x_a)+p(y_{sense}^e|x_{dest}) =$$

$$\frac{1}{\sqrt{2\pi\sigma_{e,x_a}^2}}e^{\frac{-(RR_{e,x_a}-\mu_{e,x_a})^2}{2\sigma_{e,x_a}^2}} + \frac{1}{\sqrt{2\pi\sigma_{e,x_{dest}}^2}}e^{\frac{-(RR_{e,x_{dest}}-\mu_{e,x_{dest}})^2}{2\sigma_{e,x_{dest}}^2}}$$

which is simply the product of two Gaussians multiplied together. Note that prior to performing transition probability product of sums, all probabilities associated with a given exciter, e, are normalized such that:

$$\sum_{a \in H}(p(y_{poll}^e|x_a)+p(y_{sense}^e|x_{dest}))=1$$

$H \equiv$ Set of all hypothesis regions

The process described above can also include a model for the probability of reading a tag at a given location relative to the exciter's beam and tag environment (presence of absorbing material, etc). Such a model subsumes statistics on the spatial multipath field, whose large scale structure is somewhat sampled by frequency hopping. This predicted probability can be used at each read opportunity to update the Bayesian estimate for each hypothesis, whether the tag was read or not. Each of these hypotheses has a particular spatial trajectory versus time; some tags are consider static (at the same location for all measurements), and some are moving (usually at constant velocity in a particular direction, such as through a door or loading area). Since sensors external to the RFID system are used to align the conjectured moving trajectories in time, a simplifying approximation can be made to the every-read-opportunity approach, namely that read fraction statistics can be kept during key time intervals surrounding the events. The statistics on these read fraction averages often follow Poisson statistics, based on the individual probability of a read and the number of opportunities to read in the interval. (An exception to this is the case of static tags, where there is a high correlation between read fraction over time; this correlation can be taken into account with a spatial correlation function, which has correlation distance of roughly a wavelength/half-wavelength). In our preferred embodiment (described above), we approximate Poisson statistics with a Gaussian distribution on read fraction.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. An RFID system configured to manipulate RFID tags, comprising:
    an RFID receiver system configured to read RFID tag information from activated RFID tags within a receive coverage area; and
    a plurality of exciters defining a plurality of interrogation spaces within the receive coverage area of the RFID receiver system, where at least one of the plurality of exciters is able to activate an RFID tag within the plurality of interrogation spaces and the plurality of interrogation spaces are contained within the receive coverage area of the RFID receiver system;
    wherein one of the plurality of exciters is a wired exciter with which the RFID receiver system communicates via a wired connection, where the wired exciter comprises:
        a coupler configured to split a received RF signal;
        an RF chain including a receive low noise amplifier; and
        a transmit antenna;
    wherein the RFID receiver system is configured to transmit a control signal to one of the plurality of exciters and includes an RFID tag interrogation signal;
    wherein the wired exciter is configured to receive the control signal;
    wherein the wired exciter is configured to couple the control signal into the RF chain to amplify the RFID tag interrogation signal received via the control signal and illuminate an interrogation space with the amplified RFID tag interrogation signal using the transmit antenna and thereby activate an RFID tag within the interrogation space;
    wherein the wired exciter is configured to return exciter status information to the RFID receiver system by generating a waveform that emulates an illuminated RFID tag when the control signal includes a message to control the reporting of exciter status information; and
    wherein the RFID receiver system is configured to read RFID tag information from an RFID tag activated by an RFID tag interrogation signal generated by one of the plurality of exciters.

2. The RFID system of claim 1, wherein the RFID receiver system is configured to transmit control signals that activate a plurality of the exciters to transmit RFID tag interrogation signals concurrently using different frequencies.

3. The RFID system of claim 2, wherein the control signals transmitted by the RFID receiver system cause the plurality of activated exciters to transmit in accordance with a frequency hopping protocol.

4. The RFID system of claim 2, wherein the RFID receiver system is configured to allocate frequencies to exciters randomly.

5. The RFID system of claim 2, wherein:
    the RFID receiver system possesses information concerning the exciter distribution topology; and
    the RFID receiver system uses the topology information when allocating frequencies to activated exciters.

6. The RFID system of claim 1, wherein the control signal includes an n-bit address.

7. The RFID system of claim 1, wherein the control signal includes all the necessary signal characteristics and parameters to generate the desired waveform output from the exciter.

8. The RFID system of claim 7, wherein the control signal includes information that can be used by an exciter to perform transmit power calibration.

9. The RFID system of claim 1, further comprising:
    a second RFID receiver system configured to detect information from RFID tags within a second receive coverage area; and
    a plurality of exciters defining a plurality of interrogation spaces within the receive coverage area of the second RFID receiver system;
    wherein the second RFID receiver system is configured to transmit a control signal that identifies one of the plurality of exciters and includes information indicative of an RFID tag interrogation signal;
    wherein the plurality of exciters within the coverage area of the second RFID receiver system are configured to receive the control signal from the second RFID receiver system; and
    wherein the exciter identified in the control signal is configured to illuminate an interrogation space within the coverage area of the second RFID receiver system with the RFID tag interrogation signal.

10. The RFID system of claim 1, wherein:
    the RFID receiver system is configured to detect RFID tag information when an exciter illuminates an interrogation space with an RFID tag interrogation signal; and
    the RFID receiver system is configured to determine whether the detected RFID tag information is from an RFID tag located within the interrogation space illuminated by the exciter.

11. The RFID system of claim 10, further comprising:
    a sensor located within the illuminated interrogation space configured to detect changes within the interrogation space;
    wherein the sensor is configured to communicate sensor output to the RFID receiver system; and
    wherein the RFID receiver system is configured to determine whether the detected RFID tag information is from an RFID tag located within the interrogation space illuminated by the exciter using information including the sensor output.

12. The RFID system of claim 10, wherein:
    the RFID receiver system is configured to detect RFID tag information when other exciters illuminate other interrogation spaces with RFID tag interrogation signals; and
    the RFID receiver system is configured to determine whether the detected RFID tag information is from an RFID tag located within the interrogation space illuminated by the exciter using information including the RFID tag information detected when other exciters illuminated other interrogation spaces.

13. The RFID system of claim 10, wherein:
the RFID tag information is an RF signal;
the RFID receiver system is configured to collect information concerning features of the RFID tag information RF signal; and
the RFID receiver system is configured to determine whether the detected RFID tag information is from an RFID tag located within the interrogation space illuminated by the exciter using information including the features of the RFID tag information RF signal.

14. The RFID system of claim 13, wherein the collected features of the RFID tag information RF signal include signal strength, signal-to-noise ratio, and direction of arrival.

15. The RFID system of claim 10, wherein:
the RFID receiver system repeatedly causes a plurality of exciters to sequentially illuminate a plurality of interrogation spaces and records the detection of RFID tag information; and
the RFID receiver system is configured to determine whether detected information is from an RFID tag located within an interrogation space illuminated by one of the plurality of exciters using information including the read rate at which the RFID tag information is detected when the interrogation space is illuminated.

16. The RFID system of claim 15, wherein:
the RFID receiver system possesses information concerning the exciter topography;
the RFID receiver system is configured to estimate expected detection rates for RFID tags in different interrogation spaces; and
the RFID receiver system is configured to determine whether detected information is from an RFID tag located within an interrogation space illuminated by one of the plurality of exciters using information including the read rate at which the RFID tag information is detected when the interrogation space is illuminated and the expected detection rates for RFID tags in different interrogation spaces.

17. The RFID system of claim 16, wherein the RFID receiver system is configured to determine movement of an RFID tag from one interrogation space to another interrogation space using information including the rate at which the information is detected when interrogation spaces are illuminated and the expected detection rates for RFID tags in different interrogation spaces.

18. An RFID system configured to manipulate RFID tags, comprising:
an RFID receiver system configured to read RFID tag information from activated RFID tags within a receive coverage area; and
a plurality of exciters defining a plurality of interrogation spaces within the receive coverage area of the RFID receiver system, where at least one of the plurality of exciters is able to activate an RFID tag within the plurality of interrogation spaces and the plurality of interrogation spaces are contained within the receive coverage area of the RFID receiver system;
wherein one of the plurality of exciters is a wireless exciter with which the RFID receiver system communicates via a wireless connection, where the wireless exciter comprises:
a receive antenna;
an RF synthesizer; and
a transmit antenna;
wherein the RFID receiver system is configured to transmit control signals to the plurality of exciters, where the control signals identify and activate a plurality of exciters to transmit RFID tag interrogation signals concurrently using different frequencies;
wherein the RFID receiver system is configured to transmit an RFID tag interrogation signal on a first frequency;
wherein the wireless exciter is configured to receive a control signal using the receive antenna;
when the wireless exciter is identified in the control signal, the wireless exciter is configured to:
down convert an RFID tag interrogation signal received via the receive antenna;
upconvert the baseband signal to a second transmit frequency generated by the RF synthesizer; and
illuminate an interrogation space with the upconverted RFID tag interrogation signal using the transmit antenna to activate an RFID tag within the interrogation space;
wherein the wireless exciter is configured to return exciter status information to the RFID receiver system by generating a waveform that emulates an illuminated RFID tag when the control signal includes a message to control the reporting of exciter status information; and
wherein the RFID receiver system is configured to read RFID tag information from an RFID tag activated by an RFID tag interrogation signal generated by one of the plurality of exciters.

19. The RFID system of claim 18, wherein the control signals transmitted by the RFID receiver system cause the plurality of activated exciters to transmit in accordance with a frequency hopping protocol.

20. The RFID system of claim 18, wherein:
the RFID receiver system is configured to detect RFID tag information when an exciter illuminates an interrogation space with an RFID tag interrogation signal; and
the RFID receiver system is configured to determine whether the detected RFID tag information is from an RFID tag located within the interrogation space illuminated by the exciter.

21. The RFID system of claim 20, further comprising:
a sensor located within the illuminated interrogation space configured to detect changes within the interrogation space;
wherein the sensor is configured to communicate sensor output to the RFID receiver system; and
wherein the RFID receiver system is configured to determine whether the detected RFID tag information is from an RFID tag located within the interrogation space illuminated by the exciter using information including the sensor output.

22. The RFID system of claim 20, wherein:
the RFID receiver system is configured to detect RFID tag information when other exciters illuminate other interrogation spaces with RFID tag interrogation signals; and
the RFID receiver system is configured to determine whether the detected RFID tag information is from an RFID tag located within the interrogation space illuminated by the exciter using information including the RFID tag information detected when other exciters illuminated other interrogation spaces.

23. The RFID system of claim 20, wherein:
the RFID tag information is an RF signal;
the RFID receiver system is configured to collect information concerning features of the RFID tag information RF signal; and
the RFID receiver system is configured to determine whether the detected RFID tag information is from an RFID tag located within the interrogation space illuminated by the exciter using information including the features of the RFID tag information RF signal.

24. The RFID system of claim 23, wherein the collected features of the RFID tag information RF signal include signal strength, signal-to-noise ratio, and direction of arrival.

25. The RFID system of claim 20, wherein:
the RFID receiver system repeatedly causes a plurality of exciters to sequentially illuminate a plurality of interrogation spaces and records the detection of RFID tag information; and
the RFID receiver system is configured to determine whether detected information is from an RFID tag located within an interrogation space illuminated by one of the plurality of exciters using information including the read rate at which the RFID tag information is detected when the interrogation space is illuminated.

26. The RFID system of claim 25, wherein:
the RFID receiver system possesses information concerning the exciter topography;
the RFID receiver system is configured to estimate expected detection rates for RFID tags in different interrogation spaces; and
the RFID receiver system is configured to determine whether detected information is from an RFID tag located within an interrogation space illuminated by one of the plurality of exciters using information including the read rate at which the RFID tag information is detected when the interrogation space is illuminated and the expected detection rates for RFID tags in different interrogation spaces.

27. The RFID system of claim 26, wherein the RFID receiver system is configured to determine movement of an RFID tag from one interrogation space to another interrogation space using information including the read rate at which the information is detected when interrogation spaces are illuminated and the expected detection rates for RFID tags in different interrogation spaces.

28. The RFID system of claim 18, where the frequency of the second RF frequency is the same as the frequency of the first RF frequency.

* * * * *